US012234565B2

(12) United States Patent
Minamibayashi et al.

(10) Patent No.: US 12,234,565 B2
(45) Date of Patent: Feb. 25, 2025

(54) COMPOSITE ELECTROLYTE MEMBRANE

(71) Applicant: Toray Industries, Inc., Tokyo (JP)

(72) Inventors: Kenta Minamibayashi, Otsu (JP); Yoshitsugu Funatsu, Otsu (JP); Yoko Sakiyama, Otsu (JP); Daisuke Ogata, Otsu (JP); Daisuke Izuhara, Otsu (JP)

(73) Assignee: Toray Industries, Inc., Tokyo (JP)

( * ) Notice: Subject to any disclaimer, the term of this patent is extended or adjusted under 35 U.S.C. 154(b) by 698 days.

(21) Appl. No.: 16/971,148

(22) PCT Filed: Mar. 25, 2019

(86) PCT No.: PCT/JP2019/012456
§ 371 (c)(1),
(2) Date: Aug. 19, 2020

(87) PCT Pub. No.: WO2019/188960
PCT Pub. Date: Oct. 3, 2019

(65) Prior Publication Data
US 2021/0095386 A1 Apr. 1, 2021

(30) Foreign Application Priority Data
Mar. 29, 2018 (JP) ................................. 2018-064031

(51) Int. Cl.
| C25B 13/02 | (2006.01) |
| B01D 69/10 | (2006.01) |
| B01D 69/12 | (2006.01) |
| B01D 71/48 | (2006.01) |
| B01D 71/52 | (2006.01) |
| C25B 1/04 | (2021.01) |
| C25B 9/19 | (2021.01) |
| C25B 11/056 | (2021.01) |
| C25B 11/069 | (2021.01) |
| C25B 13/08 | (2006.01) |
| F04B 45/047 | (2006.01) |

(52) U.S. Cl.
CPC ............ *C25B 13/02* (2013.01); *B01D 69/107* (2022.08); *B01D 69/1213* (2022.08); *B01D 71/48* (2013.01); *B01D 71/5222* (2022.08); *C25B 1/04* (2013.01); *C25B 9/19* (2021.01); *C25B 11/056* (2021.01); *C25B 11/069* (2021.01); *C25B 13/08* (2013.01); *B01D 2325/0281* (2022.08); *F04B 45/047* (2013.01)

(58) Field of Classification Search
CPC ....... C25B 13/00–13/08; H01M 50/40–50/497
See application file for complete search history.

(56) References Cited

U.S. PATENT DOCUMENTS

| 4,872,958 A * | 10/1989 | Suzuki | C08J 5/2275 204/252 |
| 6,042,959 A * | 3/2000 | Debe | H01M 8/1004 429/492 |
| 2003/0054232 A1* | 3/2003 | Zucker | H01M 50/466 429/144 |
| 2012/0234674 A1* | 9/2012 | Kameyama | H01M 8/1023 204/252 |
| 2013/0313187 A1* | 11/2013 | Yin | B01D 67/0002 210/500.33 |
| 2014/0370404 A1 | 12/2014 | Kato et al. | |
| 2015/0270522 A1* | 9/2015 | Yamada | H01M 50/44 429/145 |
| 2018/0051380 A1* | 2/2018 | Yoon | C25B 1/04 |
| 2018/0142367 A1* | 5/2018 | Hirano | C25B 13/02 |
| 2019/0078221 A1 | 3/2019 | Zhang et al. | |
| 2020/0091532 A1 | 3/2020 | Okamoto et al. | |
| 2022/0247038 A1* | 8/2022 | Abusleme | H01M 50/42 |

FOREIGN PATENT DOCUMENTS

| EP | 2157123 A1 * | 2/2010 | ................ C08J 9/26 |
| EP | 2692913 A1 | 2/2014 | |
| EP | 3147982 A1 * | 3/2017 | ............ C08J 5/2206 |
| JP | 2005108662 A | 4/2005 | |
| JP | 2010-232121 A | 10/2010 | |
| JP | 2010242246 A | 10/2010 | |
| JP | 2016216826 A | 12/2016 | |
| JP | 2017106056 A | 6/2017 | |
| JP | 2017117786 A | 6/2017 | |

(Continued)

OTHER PUBLICATIONS

Supplementary European Search Report for European Application No. 19 777 158.7, dated Nov. 25, 2021, 7 pages.
Carmo et al., "A Comprehensive Review on PEM Water Electrolysis", International Journal of Hydrogen Energy, 2013, vol. 38, pp. 4901-4934.
International Search Report and Written Opinion for International Application No. PCT/JP2019/012456, dated Jun. 11, 2019, 6 pages.

(Continued)

*Primary Examiner* — Alexander W Keeling
(74) *Attorney, Agent, or Firm* — BUCHANAN INGERSOLL & ROONEY PC

(57) ABSTRACT

The purpose of the present invention is to provide a composite electrolyte membrane which has excellent chemical resistance and can maintain sufficient mechanical strength even under conditions of high humidity and high pressure, which are the operating conditions for electrochemical hydrogen pumps and water electrolyzers. This composite electrolyte membrane, which is for achieving said purpose, has a composite layer obtained by combining a polyelectrolyte with a mesh woven material that satisfies (1) and (2) and comprises liquid crystal polyester fibers or polyphenylene sulfide fibers. (1): Mesh thickness (μm)/fiber diameter (μm) <2.0. (2): Opening (μm)/fiber diameter (μm)>1.0.

18 Claims, No Drawings

(56) References Cited

FOREIGN PATENT DOCUMENTS

| WO | 2013100083 | A1 | 7/2013 |
| WO | 2017141878 | A1 | 8/2017 |
| WO | 2017181915 | A1 | 10/2017 |

OTHER PUBLICATIONS

Office Action (Request for the Submission of an Opinion) issued Feb. 26, 2024, by the Korean Intellectual Property Office in corresponding Korean Patent Application No. 10-2020-7024774 and an English translation of the Office Action. (12 pages).

* cited by examiner

COMPOSITE ELECTROLYTE MEMBRANE

CROSS REFERENCE TO RELATED APPLICATIONS

This is the U.S. National Phase application of PCT/JP2019/012456, filed Mar. 25, 2019, which claims priority to Japanese Patent Application No. 2018-064031, filed Mar. 29, 2018, the disclosures of each of these applications being incorporated herein by reference in their entireties for all purposes.

FIELD OF THE INVENTION

The present invention relates to a composite electrolyte membrane.

BACKGROUND OF THE INVENTION

In recent years, hydrogen energy has attracted attention as a means for storing and transporting energy in the next generation. Hydrogen, when used as a fuel for fuel cells, can be converted into electric power with theoretically higher energy efficiency than in power generation using a heat engine, and is free from harmful emissions. Therefore, hydrogen can serve as a highly efficient, clean energy source.

Hydrogen is a secondary energy, and is produced by various production methods. Electrolysis of water using surplus electric power from renewable energy can convert electric power into hydrogen energy without emission of carbon dioxide. Hydrogen production schemes by electrolysis of water include alkaline water electrolysis and polymer electrolyte membrane (PEM) water electrolysis. The PEM water electrolysis has a feature that it can be performed at high current density and can flexibly respond to output fluctuations of renewable energy.

In addition, depending on the storage system, hydrogen can be transported by tank trucks or tankers. Therefore, hydrogen is greatly advantageous in terms of electric power storage since it can be supplied to areas with high demand when needed. Examples of hydrogen storage systems include compressed hydrogen, liquid hydrogen, and occlusion of hydrogen in alloys. Above all, there is an increasing demand for compressed hydrogen in terms of ready use as a gaseous fuel and energy efficiency.

Conventionally, a positive displacement compressor has been used as a production scheme of compressed hydrogen, but in recent years, an electrochemical hydrogen pump has attracted attention. The electrochemical hydrogen pump is a hydrogen compressor that compresses hydrogen electrochemically by passage of an electric current through a catalyst coated polymer electrolyte membrane. Compared to the positive displacement compressor, the electrochemical hydrogen pump has a feature that it has high energy efficiency and quietness, is compact, and is also capable of hydrogen purification.

As an example of such an electrolyte membrane used in an electrochemical hydrogen pump or a water electrolysis apparatus, Non-Patent Document 1 reports an example of use of "Nafion (registered trademark)" manufactured by E. I. du Pont de Nemours and Company in the U.S., which is a typical fluoropolymer electrolyte membrane. Further, Patent Document 1 reports an example of use of a hydrocarbon-based electrolyte membrane. Patent Document 2 reports an electrolyte membrane including, as a reinforcing material, a fiber cloth made of a polyethylene fiber or a polyether ether ketone fiber.

PATENT DOCUMENTS

Patent Document 1: Japanese Patent Laid-open Publication No. 2016-216826
Patent Document 2: Japanese Patent Laid-open Publication No. 2005-108662

NON-PATENT DOCUMENT

Non-Patent Document 1: "International Journal of Hydrogen Energy", 38 (2013) 4901-4934

SUMMARY OF THE INVENTION

However, the fluorine-based electrolyte membrane and the hydrocarbon-based electrolyte membrane having no reinforcing material used in Non-Patent Document 1 and Patent Document 1 may have significantly reduced mechanical strength due to an increase in the water content. Therefore, these electrolyte membranes have insufficient mechanical strength for use in an electrochemical hydrogen pump that is operated under high humidity and high pressure conditions or a water electrolysis apparatus that is operated under hot water conditions.

Therefore, the composite electrolyte membrane used in Patent Document 2, which includes a fiber cloth as a reinforcing material, may serve as an alternative to the above-mentioned electrolyte membranes used in an electrochemical hydrogen pump or a water electrolysis apparatus. The conventional composite electrolyte membrane, however, cannot maintain sufficient mechanical strength when used in an electrochemical hydrogen pump or a water electrolysis apparatus under high humidity and high pressure conditions.

It is an object of the present invention to provide a composite electrolyte membrane that is excellent in chemical resistance and is capable of maintaining sufficient mechanical strength even under high humidity and high pressure conditions as the operating conditions of an electrochemical hydrogen pump or a water electrolysis apparatus.

The above-mentioned object of the present invention is achieved by the following means.

A composite electrolyte membrane including a composite layer that is a composite of a mesh fabric including a liquid crystal polyester fiber or a polyphenylene sulfide fiber and satisfying conditions (1) and (2) shown below, and a polymer electrolyte:

$$\text{gauze thickness } (\mu m)/\text{fiber diameter } (\mu m) < 2.0; \text{ and} \quad (1)$$

$$\text{opening } (\mu m)/\text{fiber diameter } (\mu m) > 1.0. \quad (2)$$

The composite electrolyte membrane of the present invention is excellent in chemical resistance and is capable of maintaining sufficient mechanical strength even under high humidity and high pressure conditions as the operating conditions of an electrochemical hydrogen pump or a water electrolysis apparatus.

DETAILED DESCRIPTION OF EMBODIMENTS OF THE INVENTION

The composite electrolyte membrane according to embodiments of the present invention includes a composite layer that is a composite of a mesh fabric including a liquid crystal polyester fiber or a polyphenylene sulfide fiber and satisfying conditions (1) and (2) shown below, and a polymer electrolyte:

$$\text{gauze thickness (µm)/fiber diameter (µm)}<2.0; \text{ and} \qquad (1)$$

$$\text{opening (µm)/fiber diameter (µm)}>1.0. \qquad (2)$$

Hereinafter, the composite electrolyte membrane according to embodiments of the present invention will be described in detail.

[Polymer Electrolyte]

In the present invention, the polymer electrolyte may be either a fluoropolymer electrolyte or a hydrocarbon polymer electrolyte.

A "fluoropolymer electrolyte" is a polymer having a main chain containing perfluorocarbon as a main constituent unit and having an ionic group added to the main chain or a side chain. Specific examples of the fluoropolymer electrolyte include perfluorocarbon sulfonic acid polymers such as Nafion (registered trademark, manufactured by E. I. du Pont de Nemours and Company), Aciplex (registered trademark, manufactured by Asahi Kasei Corporation), and FLEMION (registered trademark, manufactured by Asahi Glass Co., Ltd.), polytrifluorostyrene sulfonic acid polymers, perfluorocarbon phosphonic acid polymers, trifluorostyrene sulfonic acid polymers, ethylene tetrafluoroethylene-g-styrene sulfonic acid polymers, ethylene-tetrafluoroethylene copolymers, polyvinylidene fluoride-perfluorocarbon sulfonic acid polymers, ethylene-tetrafluoroethylene copolymers, and resins having trifluorostyrene as a base polymer. From the viewpoint of power generation performance such as chemical stability, a fluoropolymer electrolyte containing a perfluorocarbon sulfonic acid polymer is particularly preferable.

A "hydrocarbon polymer electrolyte" is an ionic group-containing hydrocarbon polymer. The "hydrocarbon polymer" refers to a polymer that has a main chain containing a hydrocarbon as a main constituent unit and has an ionic group added to the main chain or a side chain, and in which the main chain or the side chain is substantially not fluorinated. Incidentally, the phrase "substantially not fluorinated" does not exclude a polymer having a fluorinated portion in a very small part of the main chain or side chain. Specifically, a polymer having a content of fluorine atoms of less than 5% based on the number average molecular weight of the polymer is also referred to as a hydrocarbon polymer.

In the composite electrolyte membrane of the present invention, it is more preferable that the polymer electrolyte be a hydrocarbon polymer electrolyte. This is because the hydrocarbon polymer electrolyte has high mechanical strength, high gas barrier properties, and high proton conductivity as an electrolyte, and is highly compatible with the mesh fabric including a liquid crystal polyester fiber or a polyphenylene sulfide fiber used in embodiments of the present invention. A composite electrolyte membrane including a hydrocarbon polymer electrolyte, when applied to an electrochemical hydrogen pump or a water electrolysis apparatus, exhibits high performance and durability. Further, since the polymer electrolyte is highly compatible with the mesh fabric including a liquid crystal polyester fiber or a polyphenylene sulfide fiber, the polymer electrolyte, when forming a composite with the mesh fabric, easily provides a uniform composite electrolyte membrane. Herein, the "composite" means a state in which the pores included in the mesh fabric are filled with the polymer electrolyte, and the "composite layer" means a layer of the polymer electrolyte membrane having a structure in which the pores in the mesh fabric are filled with the polymer electrolyte.

The hydrocarbon polymer that constitutes the hydrocarbon polymer electrolyte is particularly preferably an aromatic hydrocarbon polymer. The aromatic hydrocarbon polymer is a polymer including a hydrocarbon skeleton and having an aromatic ring in the main chain. Specific examples of the aromatic hydrocarbon polymer include polymers having, in the main chain, a structure selected from polysulfone, polyether sulfone, polyphenylene oxide, a polyarylene ether polymer, polyphenylene sulfide, polyphenylene sulfide sulfone, polyparaphenylene, a polyarylene polymer, polyarylene ketone, polyether ketone, polyarylene phosphine oxide, polyether phosphine oxide, polybenzoxazole, polybenzothiazole, polybenzimidazole, polyamide, polyimide, polyetherimide, and polyimidesulfone together with the aromatic ring. Note that "polysulfone", "polyether sulfone", "polyether ketone", and the like referred to herein are generic terms for structures having a sulfone bond, an ether bond, or a ketone bond in their molecular chains, and encompass polyether ketone ketone, polyether ether ketone, polyether ether ketone ketone, polyether ketone ether ketone ketone, and polyether ketone sulfone. The hydrocarbon skeleton may have a plurality of structures among the above-mentioned structures. Above all, a polymer having a polyether ketone structure in the main chain is most preferable.

The ionic group of the polymer electrolyte may be any ionic group having a proton exchange ability. Such an ionic group is preferably a sulfonic acid group, a sulfonimide group, a sulfuric acid group, a phosphoric acid group, a phosphoric acid group, or a carboxylic acid group. The polymer may contain two or more types of ionic groups. Above all, it is more preferable that the polymer have at least a sulfonic acid group, a sulfonimide group, or a sulfuric acid group from the viewpoint of high proton conductivity, and it is most preferable that the polymer have a sulfonic acid group from the viewpoint of raw material cost.

[Mesh Fabric]

The mesh fabric used as a reinforcing material in embodiments of the present invention includes a liquid crystal polyester fiber or a polyphenylene sulfide fiber. Use of a mesh fabric including a liquid crystal polyester fiber or a polyphenylene sulfide fiber provides a composite electrolyte membrane excellent in chemical resistance and mechanical strength. Above all, the mesh fabric preferably includes a liquid crystal polyester fiber because a composite electrolyte membrane further excellent in mechanical strength can be easily obtained.

Herein, the "liquid crystal polyester fiber" refers to a fiber in which a liquid crystal polyester accounts for 50% or more in terms of the area rate in the fiber cross section. A fiber as a whole, in which the liquid crystal polyester accounts for 50% or more in the fiber cross section, exhibits the mechanical properties and chemical resistance of the liquid crystal polyester.

The liquid crystal polyester fiber used in the present invention may be a composite fiber with other components as long as the liquid crystal polyester accounts for 50% or more in the fiber cross section. However, in order to make the liquid crystal polyester strongly exhibit the characteristics, it is preferable that the rate of the liquid crystal polyester in the fiber cross section be as high as possible. Specifically, it is preferable that the liquid crystal polyester account for 60% or more in the fiber cross section, it is more preferable that the liquid crystal polyester account for 70% or more in the fiber cross section, and it is still more preferable that the liquid crystal polyester fiber contain a single component of liquid crystal polyester. The liquid crystal polyester fiber containing a single component of liquid crystal polyester can easily exhibit high chemical resistance.

A liquid crystal polyester fiber that is a composite fiber with other components can be obtained by employing a core-sheath composite fiber or a sea-island composite fiber. A specific product name of such a fiber is "VECRY" (registered trademark) manufactured by Kuraray Co., Ltd.

A liquid crystal polyester is a polyester capable of forming an anisotropic melt phase (liquid crystalline) when melted. Such characteristics can be observed, for example, by placing a sample made of a liquid crystal polyester on a hot stage, heating the sample in a nitrogen atmosphere by raising the temperature, and observing the light transmitted through the sample under polarized light.

Examples of the liquid crystal polyester used in the liquid crystal polyester fiber that constitutes the mesh fabric in embodiments of the present invention include:
  a. polymerized products of aromatic oxycarboxylic acids;
  b. polymerized products of an aromatic dicarboxylic acid and an aromatic diol or an aliphatic diol; and
  c. copolymerized products of a and b. Above all, it is preferable that the liquid crystal polyester fiber contain a wholly aromatic polyester for high strength, high elastic modulus, and high heat resistance. Herein, the "wholly aromatic polyester" refers to a polyester that does not contain both an aliphatic diol and an aliphatic dicarboxylic acid.

Herein, examples of the aromatic oxycarboxylic acid include hydroxybenzoic acid, hydroxynaphthoic acid, and alkyl, alkoxy, and halogen substitution products of the above-mentioned aromatic oxycarboxylic acids.

Examples of the aromatic dicarboxylic acid include terephthalic acid, isophthalic acid, diphenyldicarboxylic acid, naphthalenedicarboxylic acid, diphenyletherdicarboxylic acid, diphenoxyethanedicarboxylic acid, diphenylethanedicarboxylic acid, and alkyl, alkoxy, and halogen substitution products of the above-mentioned aromatic dicarboxylic acids.

Examples of the aromatic diol include hydroquinone, resorcin, dioxydiphenyl, naphthalene diol, and alkyl, alkoxy, and halogen substitution products of the above-mentioned aromatic diols.

Examples of the aliphatic diol include ethylene glycol, propylene glycol, butanediol, and neopentyl glycol.

Preferable examples of the liquid crystal polyester used in the present invention include a copolymerized product of a p-hydroxybenzoic acid component, a 4,4'-dihydroxybiphenyl component, a hydroquinone component, and a terephthalic acid component and/or an isophthalic acid component, a copolymerized product of a p-hydroxybenzoic acid component and a 6-hydroxy-2-naphthoic acid component, and a copolymerized product of a p-hydroxybenzoic acid component, a 6-hydroxy-2-naphthoic acid component, a hydroquinone component, and a terephthalic acid component, because these polyesters are excellent in high strength, high elastic modulus, and chemical resistance.

In the present invention, it is particularly preferable that the wholly aromatic polyester be a liquid crystal polyester including structural units (I), (II), (III), (IV), and (V) shown below. In the present invention, the "structural unit" means a unit capable of forming a repeating structure in the main chain of the polymer.

[Chemical Formula 1]

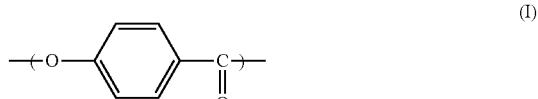

(I)

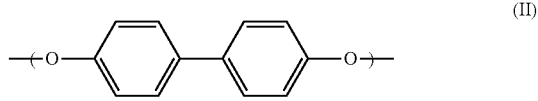

(II)

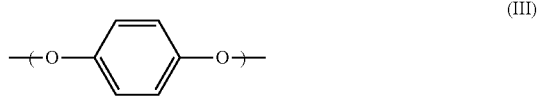

(III)

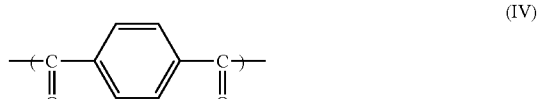

(IV)

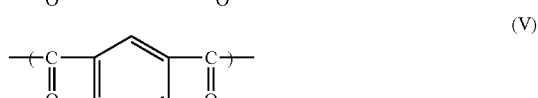

(V)

This combination imparts appropriate crystallinity and non-linearity to the molecular chain, so that the fiber may have increased strength and elastic modulus, and may easily have high mechanical properties even if the fiber diameter is small. Further, since the combination can improve abrasion resistance, it is suitable for a mesh fabric having a large permeation volume. Further, since the combination makes the fiber easily flattened in the lateral direction (direction perpendicular to the fiber axis), it is easy to reduce the gauze thickness.

Further, since the liquid crystal polyester including the structural units (I), (II), (III), (IV), and (V) contains a component containing a diol that is not bulky and has high linearity, such as the structural units (II) and (III), the molecular chain in the fiber has an orderly, less disorganized structure, the polyester does not have excessively high crystallinity, and the interaction in the direction perpendicular to the fiber axis can be easily maintained. As a result, high strength and high elastic modulus are obtained, and the liquid crystal polyester fiber subjected to high-temperature heat treatment after solid phase polymerization can easily have particularly excellent abrasion resistance.

Further, the amount of the structural unit (I) is preferably 40 to 85 mol %, more preferably 65 to 80 mol %, still more preferably 68 to 75 mol % based on the total amount of the structural units (I), (II), and (III). When the amount of the structural unit (I) is within the above-mentioned range, the crystallinity can be controlled within an appropriate range, and high strength and high elastic modulus can be easily obtained.

The amount of the structural unit (II) is preferably 60 to 90 mol %, more preferably 60 to 80 mol %, still more preferably 65 to 75 mol % based on the total amount of the structural units (II) and (III). When the amount of the structural unit (II) is within the above-mentioned range, the polyester does not have excessively high crystallinity, and the interaction in the direction perpendicular to the fiber axis can be maintained. Therefore, the liquid crystal polyester fiber can have improved abrasion resistance, and is suitable for a mesh fabric having a large permeation volume. Moreover, since the fiber is easily flattened in the lateral direction (direction perpendicular to the fiber axis), it is possible to reduce the gauze thickness.

The amount of the structural unit (IV) is preferably 40 to 95 mol %, more preferably 50 to 90 mol %, still more preferably 60 to 85 mol % based on the total amount of the structural units (IV) and (V). When the amount of the structural unit (IV) is within the above-mentioned range, the linearity of the polymer is moderately disturbed. Therefore, the liquid crystal polyester fiber can have improved abrasion resistance, and is suitable for a mesh fabric having a large permeation volume. Moreover, since the fiber is easily flattened in the lateral direction (direction perpendicular to the fiber axis), it is possible to reduce the gauze thickness.

Preferable ranges of the amounts of the structural units in the liquid crystal polyester used in the present invention are as follows. The liquid crystal polyester fiber used in the present invention can be suitably obtained by adjusting the composition so that the liquid crystal polyester may satisfy the above-mentioned conditions within the following ranges.

Structural unit (I): 45 to 65 mol %
Structural unit (II): 12 to 18 mol %
Structural unit (III): 3 to 10 mol %
Structural unit (IV): 5 to 20 mol %
Structural unit (V): 2 to 15 mol %

The liquid crystal polyester used in the present invention may be copolymerized, in addition to the above-mentioned structural units, with the following components in an amount within the range of about 5 mol % or less so as not to impair the effects of the present invention: aromatic dicarboxylic acids such as 3,3'-diphenyldicarboxylic acid and 2,2'-diphenyldicarboxylic acid, aliphatic dicarboxylic acids such as adipic acid, azelaic acid, sebacic acid, and dodecanedioic acid, alicyclic dicarboxylic acids such as hexahydroterephthalic acid (1,4-cyclohexanedicarboxylic acid), aromatic diols such as chlorohydroquinone, 4,4'-dihydroxydiphenyl sulfone, 4,4'-dihydroxydiphenylsulfide, and 4,4'-dihydroxybenzophenone, and p-aminophenol.

Further, the following components may be added to the liquid crystal polyester in an amount within the range of about 5 wt % or less so as not to impair the effects of the present invention: vinyl polymers such as polyesters, polyolefins, and polystyrenes, and polymers such as polycarbonates, polyamides, polyimides, polyphenylene sulfide, polyphenylene oxide, polysulfones, aromatic polyketones, aliphatic polyketones, semi-aromatic polyester amides, polyether ether ketone, and fluororesins. Suitable examples of these components include polyphenylene sulfide, polyether ether ketone, nylon 6, nylon 66, nylon 46, nylon 6T, nylon 9T, polyethylene terephthalate, polypropylene terephthalate, polybutylene terephthalate, polyethylene naphthalate, polycyclohexanedimethanol terephthalate, and polyester 99M.

The polyphenylene sulfide used in the polyphenylene sulfide fiber that constitutes the mesh fabric in embodiments of the present invention is a polymer including, as a main repeating unit, a phenylene sulfide unit represented by the following structural formula (1), such as a p-phenylene sulfide unit or a m-phenylene sulfide unit. From the viewpoint of heat resistance, the polyphenylene sulfide used in the present invention is preferably a polymer including 70 mol % or more, more preferably 90 mol % or more of the repeating unit represented by the following structural formula (1).

[Chemical Formula 2]

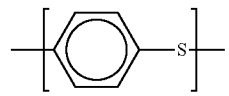
(1)

The polyphenylene sulfide used in the present invention preferably has a melting point (Tm1) of 300° C. or less, more preferably 290° C. or less. Since the polyphenylene sulfide having a melting point within the above-mentioned range can be subjected to melt spinning, or yarn making particularly in hot drawing without requiring an excessively high temperature, the temperature uniformity can be increased. Moreover, since the yarn making stability is improved, a fiber having a small fiber diameter can be obtained. The lower limit of the melting point is about 240° C. The melting point referred to herein is a value obtained by the method described in item (6) in the section of EXAMPLES.

The liquid crystal polyester or the polyphenylene sulfide used in the present invention may contain, as long as the effects of the present invention are not impaired, a small amount of inorganic substances such as various metal oxides, kaolin, and silica, and various additives such as colorants, matting agents, flame retardants, antioxidants, ultraviolet absorbers, infrared absorbers, crystal nucleating agents, fluorescent brighteners, end capping agents, and compatibilizers.

In embodiments of the present invention, a mesh fabric including the liquid crystal polyester fiber or the polyphenylene sulfide fiber is used as a reinforcing material. A "mesh fabric" is a woven fabric made of warp and weft. The woven pattern of the mesh fabric may be plain weave, twill weave, or the like. The plain weave is preferable from the viewpoint of reducing the thickness (gauze thickness) of the mesh. The liquid crystal polyester fiber or the polyphenylene sulfide fiber used in the warp and the weft is preferably a monofilament. Since a monofilament is smaller in the fiber width than a multifilament is, the monofilament may have a substantially smaller fiber diameter, and further can uniformize the opening of the mesh fabric.

In the present invention, it is preferable that the fiber that constitutes the mesh fabric have a fiber diameter of 50 μm or less. When the fiber that constitutes the mesh fabric has a fiber diameter of 50 μm or less, the volume of the fiber in the entire mesh fabric can be made small. Therefore, in use of the mesh fabric as a reinforcing material for the electrolyte membrane, the electrolyte membrane may have higher mechanical strength while maintaining proton conduction. From the above-mentioned viewpoint, the smaller the fiber diameter is, the more preferable it is, and the fiber diameter is more preferably 40 μm or less, still more preferably 30 μm or less. The lower limit of the fiber diameter is about 10 μm. The fiber diameter referred to herein is a value obtained by the method described in item (4) in the section of EXAMPLES.

In the present invention, it is preferable that the mesh fabric have an opening of 30 μm or more. The "opening" represents the distance between the fibers in the mesh fabric, that is, the length of a side of an opening part in the mesh fabric. The opening can be calculated by the following formula from the number of meshes, which is the number of fibers per 1-inch (2.54 cm) width of the mesh fabric, and the fiber diameter.

$$\text{Opening (μm)}=(25400/\text{number of meshes})-\text{fiber diameter (μm)}$$

When the opening is 30 μm or more, the mesh fabric can have large opening parts, and in use of the mesh fabric as a reinforcing material for the electrolyte membrane, the electrolyte membrane may have higher mechanical strength while maintaining proton conduction. From the above-mentioned viewpoint, the larger the opening is, the more preferable it is, and the opening is more preferably 40 μm or more, still more preferably 50 μm or more. The upper limit of the opening is about 200 μm. The opening referred to herein is a value obtained by the method described in item (4) in the section of EXAMPLES.

In the present invention, it is preferable that the mesh fabric have an opening area (OPA) of 30% or more. The OPA is an index representing the area rate of the opening parts in the mesh, and is calculated by the following formula.

$$\text{OPA (\%)}=\{\text{opening (μm)}^2/(\text{opening (μm)}+\text{fiber diameter (μm)})^2\}\times 100$$

When the OPA is 30% or more, the mesh fabric can have a large area rate of the opening parts, and in use of the mesh fabric as a reinforcing material for the electrolyte membrane, the electrolyte membrane may have higher mechanical strength while maintaining proton conduction. From the above-mentioned viewpoint, the larger the OPA is, the more preferable it is, and the OPA is more preferably 40% or more. The upper limit of the OPA is about 90%. The OPA referred to herein is a value obtained by the method described in item (4) in the section of EXAMPLES.

In the present invention, it is preferable that the mesh fabric have a permeation volume of 10 cc/m$^2$ or more. The permeation volume is an index representing the volume of the opening parts (permeable parts) per 1 m$^2$ of the mesh fabric, and is expressed in the unit of cc/m$^2$. The permeation volume can be calculated by the following formula.

$$\text{Permeation volume (cc/m}^2\text{)}=(\text{OPA (\%)}/100)\times\text{gauze thickness (μm)}$$

When the permeation volume is 10 cc/m$^2$ or more, the mesh fabric can have a large volume of the opening parts, and in use of the mesh fabric as a reinforcing material for the electrolyte membrane, the electrolyte membrane may easily have higher mechanical strength while maintaining proton conduction. From the above-mentioned viewpoint, the larger the permeation volume is, the more preferable it is, and the permeation volume is more preferably 15 cc/m$^2$ or more. The upper limit of the permeation volume is about 40 cc/m$^2$. The permeation volume referred to herein is a value obtained by the method described in item (4) in the section of EXAMPLES.

In the present invention, it is preferable that the mesh fabric have a gauze thickness of 50 μm or less. When the gauze thickness is 50 μm or less, it is possible to reduce the thickness of the entire electrolyte membrane, and in use of the electrolyte membrane in an electrochemical hydrogen pump or a water electrolysis apparatus, the electrolyte membrane may have reduced membrane resistance and thus is improved in the performance. From the above-mentioned viewpoint, the smaller the gauze thickness is, the more preferable it is, and the gauze thickness is more preferably less than 50 μm, still more preferably 45 μm or less, most preferably 40 μm or less. The lower limit of the gauze thickness is about 15 μm. The gauze thickness referred to herein is a value obtained by the method described in item (5) in the section of EXAMPLES.

In the mesh fabric including the liquid crystal polyester fiber or the polyphenylene sulfide fiber and used in embodiments of the present invention, a relationship between the gauze thickness and the fiber diameter satisfies the following formula.

$$\text{Gauze thickness (μm)/fiber diameter (μm)}<2.0$$

The gauze thickness is the height of the intersection of the fibers, which is the thickest part of the woven fabric. For example, in the case of a mesh fabric made of stainless steel, the gauze thickness is generally equal to or more than the total of diameters of two fibers. The gauze thickness/fiber diameter of less than 2.0 in the mesh fabric used in embodiments of the present invention means that the fibers are flattened in the lateral direction (direction perpendicular to the fiber axis) at the intersection portions of the fibers in the woven fabric. Use of such a mesh fabric can reduce the gauze thickness relative to the fiber diameter. Therefore, it is possible to reduce the gauze thickness without deteriorating the mechanical properties of the mesh required of a reinforcing material, and to achieve both the high reinforcement performance and excellent membrane characteristics. From the above-mentioned viewpoint, the smaller the gauze thickness/fiber diameter is, the more preferable it is, and the gauze thickness/fiber diameter is more preferably 1.7 or less, still more preferably 1.4 or less.

Further, in the mesh fabric including the liquid crystal polyester fiber or the polyphenylene sulfide fiber and used in embodiments of the present invention, a relationship between the opening and the fiber diameter satisfies the following formula.

$$\text{Opening (μm)/fiber diameter (μm)}>1.0$$

An opening/fiber diameter of more than 1.0 means that the distance between the fibers in the mesh fabric is equal to or more than the fiber diameter, and the mesh fabric has large opening parts. In use of such a mesh fabric as a reinforcing material, the electrolyte membrane may have higher mechanical strength while maintaining proton conduction, but may be deteriorated in the mechanical properties required of a reinforcing material because the mesh fabric includes small number of fibers. In the present invention, particularly when the liquid crystal polyester fiber having extremely high fiber strength is used, high mechanical properties of the mesh can be maintained even if the number of fibers is small. Therefore, the present invention can achieve both the high reinforcement performance and excellent membrane characteristics even when the opening/fiber diameter exceeds 1.0. From the above-mentioned viewpoint, the larger the opening/fiber diameter is, the more preferable it is, and the opening/fiber diameter is more preferably 1.5 or more, still more preferably 2.0 or more.

It is preferable that the mesh fabric including the liquid crystal polyester fiber and used in the present invention have a peak half width of the endothermic peak (Tm1) of 15° C. or more, the endothermic peak being observed in the measurement under a heating condition of 20° C./min from 50° C. in the differential calorimetry. In this measurement method, Tm1 represents the melting point of the fiber. As for the peak shape, it can be said that the larger the area under the peak is, that is, the larger the heat of fusion ΔHm1 is, the higher the degree of crystallinity is, and the narrower the half width of the peak is, the higher the crystal perfection is.

Therefore, a large peak half width of 15° C. or more means that the fiber has low crystallinity, has a disturbed fibril structure, and is flexible as a whole. Therefore, among liquid crystal polyester fibers, such fiber is easy to flatten in the lateral direction (direction perpendicular to the fiber axis). The larger the peak half width of the Tm1 is, the more easily the fiber is flattened in the lateral direction (direction perpendicular to the fiber axis). Therefore, the peak half width is more preferably 20° C. or more. The upper limit of the peak half width is about 80° C. The peak half width referred to herein is a value obtained by the method described in item (6) in the section of EXAMPLES. The mesh fabric including the liquid crystal polyester fiber and used in embodiments of the present invention has one endothermic peak. However, depending on the fiber structure, two or more peaks may be observed. In this case, the peak half width is the sum of the peak half widths of the peaks. Examples of the technique for setting the peak half width to 15° C. or more include a technique of heating the liquid crystal polyester fiber subjected to solid phase polymerization at a high temperature equal to or more than the melting point of the liquid crystal polyester fiber.

The mesh fabric including the liquid crystal polyester fiber and used in the present invention preferably has a melting point (Tm1) of 290° C. or more, more preferably 300° C. or more, still more preferably 310° C. or more. Owing to such a high melting point, the mesh fabric is excellent in heat resistance of the mesh. The upper limit of the melting point is about 400° C. The melting point referred to herein is a value obtained by the method described in item (6) in the section of EXAMPLES.

In the present invention, it is preferable that the mesh fabric have a heat of fusion $\Delta Hm1$ of 6.0 J/g or less. A small $\Delta Hm1$ of 6.0 J/g or less means that the fiber has low crystallinity, has a disturbed fibril structure, is flexible as a whole, and is easy to flatten in the lateral direction (direction perpendicular to the fiber axis). The smaller the $\Delta Hm1$ is, the more easily the fiber is flattened in the lateral direction (direction perpendicular to the fiber axis). Therefore, the $\Delta Hm1$ is more preferably 5.0 J/g or less. The lower limit of the $\Delta Hm1$ is about 0.1 J/g. The $\Delta Hm1$ referred to herein is a value obtained by the method described in item (6) in the section of EXAMPLES. Examples of the technique for setting the heat of fusion $\Delta Hm1$ of the mesh fabric to 6.0 J/g or less include a technique of heating the liquid crystal polyester fiber subjected to solid phase polymerization at a high temperature equal to or more than the melting point of the liquid crystal polyester fiber.

The mesh fabric including the liquid crystal polyester fiber or the polyphenylene sulfide fiber and used in the present invention preferably has a tensile strength of 200 N/5 cm or more. The mesh fabric including the liquid crystal polyester fiber or the polyphenylene sulfide fiber and having a tensile strength of 200 N/5 cm or more has sufficiently high strength and is excellent in reinforcing properties. From the above-mentioned viewpoint, the higher the tensile strength is, the more preferable it is, and the tensile strength is more preferably 300 N/5 cm or more. The upper limit of the tensile strength is about 1,000 N/5 cm. The tensile strength referred to herein is a value obtained by the method described in item (7) in the section of EXAMPLES.

The effects of the mesh fabric used in embodiments of the present invention will be described from the viewpoint of mesh properties. In embodiments of the present invention, the mesh fabric is considered to mainly function as a reinforcing material. An ideal reinforcing material is a material that is thin, has large opening parts, and is excellent in mechanical properties, thermal properties, and chemical resistance. In embodiments of the present invention, in the first place, use of the mesh fabric allows for connection of the fibers in the warp and weft directions, and thus the mesh fabric can exhibit high mechanical properties relative to the amount of the fibers used. Then, as for the mesh properties, the mesh fabric has a gauze thickness/fiber diameter of less than 2.0, that is, the mesh fabric has a small gauze thickness relative to the fiber diameter, and the mesh fabric has an opening/fiber diameter of more than 1.0, that is, the mesh fabric has large opening parts. Therefore, the mesh fabric, in use as a reinforcing material for the electrolyte membrane, may have higher mechanical strength while maintaining proton conduction.

In the present invention, the fiber that constitutes the mesh fabric may be the liquid crystal polyester fiber or the polyphenylene sulfide fiber.

As for the feature of the liquid crystal polyester fiber used, since the liquid crystal polyester fiber has thermal properties and chemical resistance required of an ideal reinforcing material, and also has high strength and high elastic modulus, the liquid crystal polyester fiber can have excellent reinforcement performance even with a small gauze thickness and large opening parts. A further synergistic effect found by the inventors is that the liquid crystal polyester fiber is easily flattened in the lateral direction (direction perpendicular to the fiber axis), and that the performance of the fiber can be improved by controlling the fiber structure. Utilizing such feature makes it possible to make the mesh fabric thinner, and when the mesh fabric is used as a reinforcing material for the electrolyte membrane, to easily obtain the mechanical strength required of an electrolyte membrane in an electrochemical hydrogen pump or a water electrolysis apparatus without impairing the proton conduction of the membrane. It is believed that the feature of the use of the liquid crystal polyester fiber lies in the points that all of such excellent heat resistance, chemical resistance, and high strength can be achieved, and that a thin mesh fabric having a gauze thickness of 50 μm or less, particularly a gauze thickness of 40 μm or less can be obtained.

In addition, as for the feature of the polyphenylene sulfide fiber used, there can be mentioned, in addition to excellent thermal properties and chemical resistance, ease of obtaining a fiber having a small fiber diameter. The reason therefor can be as follows. Specifically, since the polyphenylene sulfide has a melting point that is not excessively high, the polyphenylene sulfide can be subjected to melt spinning, or yarn making particularly in hot drawing without requiring a process with an excessively high temperature. Therefore, the temperature uniformity can be increased, and the yarn making stability is improved. Therefore, it is believed that a fiber having a small fiber diameter is easily obtained. It is believed that the feature of the use of the polyphenylene sulfide fiber lies in the point that a fiber having a small fiber diameter can be easily obtained to make the mesh fabric thinner.

[Composite Layer]

The composite electrolyte membrane according to embodiments of the present invention has a composite layer that is a composite of the above-mentioned polymer electrolyte and the above-mentioned mesh fabric including the liquid crystal polyester fiber or the polyphenylene sulfide fiber. Due to the composite formation, pores of the mesh fabric are filled with the polymer electrolyte. The filling rate of the polymer electrolyte in the composite layer is preferably 40% or more, more preferably 50% or more. If the filling rate in the composite layer is low, the power generation performance may deteriorate due to loss of the proton conduction path. The filling rate in the composite layer in the present invention is a value calculated from the IEC. Specifically, the filling rate is calculated by the method described in item (8) in the section of EXAMPLES.

The composite electrolyte membrane may include one composite layer, or may be a laminate of two or more composite layers. When the composite electrolyte membrane includes a laminate of composite layers, a plurality of composite layers having different filling rates may be stacked together. In addition, the composite electrolyte membrane may have a layer containing only a polymer electrolyte material in contact with either side or one side of the composite layer. When the composite electrolyte membrane has such a layer, it is possible to improve the adhesion between the composite electrolyte membrane and the electrode, and to suppress interface delamination.

The composite electrolyte membrane of the present invention having the composite layer can be easily reduced in the dimensional change rate in the plane direction. A smaller dimensional change rate of the composite electrolyte membrane in the plane direction thereof, in use of the composite electrolyte membrane as an electrolyte membrane in an electrochemical hydrogen pump or a water electrolysis apparatus, can suppress the deformation of the membrane due to swelling to improve the durability. The dimensional change rate $\lambda_{xy}$ of the composite electrolyte membrane in the plane direction thereof is preferably 10% or less, more preferably 8% or less, still more preferably 5% or less.

Further, the dimensional change rate of the composite electrolyte membrane in the plane direction thereof is preferably small in MD and TD anisotropy. If the composite electrolyte membrane has large anisotropy, the cell design of the electrolyte membrane of the electrochemical hydrogen pump or the water electrolysis apparatus may be restricted, or the nonuniformity of the membrane deformation may cause uneven distribution of the stress on the membrane, and the electrolyte membrane may start to break at the stressed portion. Specifically, it is preferable that the ratio of the dimensional change rate in the MD ($\lambda_{MD}$) in the plane direction of the composite electrolyte membrane to the dimensional change rate in the TD ($\lambda_{TD}$) in the same direction, that is, $\lambda_{MD}/\lambda_{TD}$ satisfy $0.25<\lambda_{MD}/\lambda_{TD}<4.0$. Herein, "MD" is a film forming direction, and "TD" is a direction orthogonal to the MD.

Herein, the dimensional change rate $\lambda$ is an index representing the change between the dimension of the composite electrolyte membrane in a dry state and the dimension of the composite electrolyte membrane after being immersed in hot water at 80° C. Specifically, the dimensional change rate is measured by the method described in item (9) in the section of EXAMPLES.

Since the composite electrolyte membrane according to embodiments of the present invention includes the mesh fabric including a high-strength liquid crystal polyester fiber or polyphenylene sulfide fiber, the composite electrolyte membrane has high mechanical strength when being used as an electrolyte membrane of an electrochemical hydrogen pump or a water electrolysis apparatus and is improved in durability even in hot water at 80° C. The tensile strength of the composite electrolyte membrane in hot water at 80° C. is preferably 50 MPa or more, more preferably 70 MPa or more. In addition, the elastic modulus of the composite electrolyte membrane in hot water at 80° C. is preferably 100 MPa or more, more preferably 300 MPa or more, still more preferably 500 MPa or more. Herein, specifically, the tensile strength and the elastic modulus of the composite electrolyte membrane in hot water at 80° C. are measured by the method described in item (10) in the section of EXAMPLES.

Since the composite electrolyte membrane according to embodiments of the present invention includes the mesh fabric including the liquid crystal polyester fiber having high acid resistance, the composite electrolyte membrane produced from the liquid crystal polyester fiber also has high acid resistance. The electrolyte membrane is exposed to acidic conditions under the operating conditions of the electrochemical hydrogen pump or the water electrolysis apparatus. In this context, use of the composite electrolyte membrane of the present invention having high acid resistance can have improved durability. The degree of acid resistance S of the composite electrolyte membrane is preferably 60% or more, more preferably 80% or more, still more preferably 90% or more. Herein, the degree of acid resistance S is an index representing the oxidative deterioration of the composite electrolyte membrane before and after being exposed to acidic conditions. Specifically, the degree of acid resistance S is measured by the method described in item (11) in the section of EXAMPLES.

The thickness of the composite layer in the composite electrolyte membrane of the present invention is not particularly limited, but is preferably 5 μm or more and 100 μm or less, more preferably 10 μm or more and 50 μm or less. When the composite layer is thick, the electrolyte membrane tends to have improved physical durability, but tends to have increased membrane resistance. On the contrary, when the composite layer is thin, the performance of the electrochemical hydrogen pump or the water electrolysis performance is improved, but the composite electrolyte membrane tends to have a problem in the physical durability and tends to cause problems such as electrical short circuit and fuel permeation.

<Method for Producing Composite Electrolyte Membrane 22

In one example, the composite electrolyte membrane of the present invention can be produced by a method for producing a composite electrolyte membrane including the following steps in this order: forming a composite of a mesh fabric including a liquid crystal polyester fiber and a polymer electrolyte in a state where an ionic group contained in the polymer electrolyte forms a salt with a cation of an alkali metal or an alkaline earth metal; and exchanging, with a proton, the cation of the alkali metal or the alkaline earth metal forming a salt with the ionic group. Hereinafter, the production method will be described. The polymer electrolyte in a state where the ionic group forms a salt with a cation of an alkali metal or an alkaline earth metal is hereinafter referred to as a "salt-type polymer electrolyte".

A preferable method for forming a composite of the mesh fabric and the salt-type polymer electrolyte is a method of impregnating the mesh fabric with a salt-type polymer electrolyte solution, and then drying the solvent to produce a composite electrolyte membrane. Examples of the method of impregnating the mesh fabric with the salt-type polymer electrolyte solution include: (1) a method of pulling up the mesh fabric immersed in the salt-type polymer electrolyte solution and removing the excess solution to control the film thickness; (2) a method of applying the salt-type polymer electrolyte solution to the mesh fabric by cast coating; and (3) a method of bonding the mesh fabric onto a support substrate to which the salt-type polymer electrolyte solution is applied by cast coating to impregnate the mesh fabric with the salt-type polymer electrolyte solution.

When the salt-type polymer electrolyte solution is impregnated into the mesh fabric by the method (3), the solvent can be dried as it is. Alternatively, when the salt-type polymer electrolyte solution is impregnated into the mesh fabric by the method (1) or (2), a method of drying the solvent of the polymer electrolyte material in a state where the mesh fabric is bonded to a separately prepared support substrate is preferable from the viewpoint of reducing the wrinkles and thickness unevenness of the composite electrolyte membrane and improving the membrane quality. The time and temperature for drying the mesh fabric can be appropriately determined experimentally, but it is preferable to dry the mesh fabric at least to such an extent that a self-supporting membrane is obtained after the membrane is separated from the substrate. The drying method may be selected from known methods such as heating of the substrate, hot air, and an infrared heater. The drying temperature is preferably 200° C. or less, more preferably 130° C. or less in consideration of decomposition of the polymer electrolyte.

The solvent used in the salt-type polymer electrolyte solution can be appropriately selected according to the polymer species. Examples of the suitably used solvent include aprotic polar solvents such as N,N-dimethylacetamide, N,N-dimethylformamide, N-methyl-2-pyrrolidone, dimethyl sulfoxide, sulfolane, 1,3-dimethyl-2-imidazolidinone, and hexamethylphosphone triamide, ester solvents such as γ-butyrolactone, ethyl acetate, and butyl acetate, carbonate solvents such as ethylene carbonate and propylene carbonate, and alkylene glycol monoalkyl ethers such as ethylene glycol monomethyl ether, ethylene glycol monoethyl ether, propylene glycol monomethyl ether, and propylene glycol monoethyl ether. A mixed solvent that is a mixture of two or more types of these solvents may also be used.

Further, for the purpose of adjusting the viscosity, it is also possible to mix, with the solvent, various low boiling point solvents including alcohol solvents such as methanol, ethanol, 1-propanol, and isopropyl alcohol, ketone solvents such as acetone, methyl ethyl ketone, and methyl isobutyl ketone, ester solvents such as ethyl acetate, butyl acetate, and ethyl lactate, hydrocarbon solvents such as hexane and cyclohexane, aromatic hydrocarbon solvents such as benzene, toluene, and xylene, halogenated hydrocarbon solvents such as chloroform, dichloromethane, 1,2-dichloroethane, perchloroethylene, chlorobenzene, dichlorobenzene, and hexafluoro isopropyl alcohol, ether solvents such as diethyl ether, tetrahydrofuran, and 1,4-dioxane, nitrile solvents such as acetonitrile, nitrated hydrocarbon solvents such as nitromethane and nitroethane, and water.

The concentration of the salt-type polymer electrolyte solution used is preferably 5 to 40 wt %, more preferably 10 to 30 wt %. When the concentration is within the above-mentioned range, the polymer electrolyte can be sufficiently filled in the pores of the mesh fabric, and a composite layer excellent in surface smoothness can be obtained. If the concentration of the salt-type polymer electrolyte solution is too low, the filling efficiency of the polymer electrolyte into the pores of the mesh fabric may be reduced, and a plurality of times of immersion treatment may be required. Meanwhile, if the concentration of the polymer electrolyte solution is too high, the solution viscosity may be too high and the polymer may not be sufficiently filled in the pores of the mesh fabric. Therefore, the filling rate in the composite layer may be lowered, and the surface smoothness of the composite electrolyte membrane may deteriorate.

The solution viscosity of the salt-type polymer electrolyte solution is preferably 100 to 50,000 mPa·s, more preferably 500 to 10,000 mPa·s. If the solution viscosity is too low, the solution may not be retained well and flow out of the mesh fabric. Meanwhile, if the solution viscosity is too high, the above-mentioned problems may occur.

As for a method for applying the salt-type polymer electrolyte solution by cast coating, techniques such as knife coating, direct roll coating, Meyer bar coating, gravure coating, reverse coating, air knife coating, spray coating, brush coating, dip coating, die coating, vacuum die coating, curtain coating, flow coating, spin coating, screen printing, and inkjet coating can be applied.

The present production method includes, after the composite of the salt-type polymer electrolyte and the mesh fabric is formed, a step of exchanging, with a proton, the cation of the alkali metal or the alkaline earth metal forming a salt with the ionic group. This step is preferably a step of bringing the composite layer of the mesh fabric and the salt-type polymer electrolyte material into contact with an acidic aqueous solution. Further, it is more preferable that the composite layer be brought into contact with the acidic aqueous solution by a step of immersing the composite layer in the acidic aqueous solution. In this step, the proton in the acidic aqueous solution is substituted with the cation that is ionically bonded to the ionic group, and residual water-soluble impurities, residual monomers, solvents, residual salts, and the like are simultaneously removed. The acidic aqueous solution is not particularly limited, and sulfuric acid, hydrochloric acid, nitric acid, acetic acid, trifluoromethanesulfonic acid, methanesulfonic acid, phosphoric acid, citric acid, or the like is preferably used. The temperature and concentration of the acidic aqueous solution are appropriately determined. From the viewpoint of productivity, it is preferable to use an aqueous sulfuric acid solution of 3 wt % or more and 30 wt % or less at a temperature of 0° C. or more and 80° C. or less.

To the composite electrolyte membrane, for the purpose of improved mechanical strength, improved thermal stability of the ionic group, improved water resistance, improved solvent resistance, improved radical resistance, improved coating property of the coating liquid, and improved storage stability, it is possible to add a crosslinking agent and additives used in usual polymer compounds, such as a crystal nucleating agent, a plasticizer, a stabilizer, a mold release agent, an antioxidant, a radical scavenger, and inorganic fine particles as long as they are not contrary to the object of the present invention.

As described above, the composite electrolyte membrane according to embodiments of the present invention is capable of maintaining sufficient mechanical strength even under high humidity and high pressure conditions as the operating conditions of an electrochemical hydrogen pump or a water electrolysis apparatus. Herein, the phrase "being capable of maintaining sufficient mechanical strength" means that the composite electrolyte membrane has at least one of satisfactory tensile strength and satisfactory elastic modulus. It is preferable that the composite electrolyte membrane have both the satisfactory tensile strength and the satisfactory elastic modulus.

When the composite electrolyte membrane has at least one of satisfactory tensile strength and satisfactory elastic modulus, preferably both the satisfactory tensile strength and the satisfactory elastic modulus, it is easy to reduce the dimensional change rate $\lambda_{xy}$ in the plane direction.

Further, since the liquid crystal polyester fiber or the polyphenylene sulfide fiber as a fiber that constitutes the mesh fabric has high chemical resistance, an electrochemical hydrogen pump or a water electrolysis apparatus including the composite electrolyte membrane of the present invention is hardly deteriorated in the mechanical properties even when being operated for a long time. In the present invention, the chemical resistance is evaluated by the acid resistance test described in item (11) in the section of EXAMPLES.

The composite electrolyte membrane of the present invention can be applied to various uses. For example, the composite electrolyte membrane can be applied to medical uses such as artificial skin, filtration uses, ion-exchange resin uses such as chlorine-resistant reverse osmosis membranes, various structural material uses, electrochemical uses, humidifying membranes, antifogging films, antistatic films, deoxidation films, solar battery films, and gas barrier films. Above all, the composite electrolyte membrane can be more preferably used in various electrochemical uses. Examples of the electrochemical uses include polymer electrolyte fuel cells, redox flow batteries, electrochemical hydrogen pumps, water electrolysis apparatuses, hydrogen purification devices, and chlor-alkali electrolysis apparatuses. The electrolyte membrane of the present invention can realize high hydrogen compression performance or water electrolysis performance while achieving sufficient mechanical strength even under high humidity and high pressure conditions as the operating conditions of an electrochemical hydrogen pump or a water electrolysis apparatus. Therefore, the electrolyte membrane can be particularly preferably used in electrochemical hydrogen pumps and water electrolysis apparatuses.

<Catalyst Coated Membrane, Membrane Electrode Assembly, Electrochemical Hydrogen Pump, and Water Electrolysis Apparatus>

The electrochemical hydrogen pump of the present invention and the water electrolysis apparatus of the present invention include the composite electrolyte membrane according to embodiments of the present invention. More specifically, the cell used in the electrochemical hydrogen pump and the water electrolysis apparatus of the present invention has a structure in which a catalyst layer, an electrode substrate, and a separator are sequentially stacked on either side of the composite electrolyte membrane according to embodiments of the present invention.

Among the above-mentioned structures, the catalyst coated membrane of the present invention includes the composite electrolyte membrane according to embodiments of the present invention, and a catalyst layer on either side of the composite electrolyte membrane. That is, the catalyst coated membrane (hereinafter referred to as a "CCM") of the present invention includes a catalyst layer on either side of the composite electrolyte membrane (that is, a laminate having a layer structure of catalyst layer/composite electrolyte membrane/catalyst layer).

Further, among the above-mentioned structures, the membrane electrode assembly of the present invention includes the composite electrolyte according to embodiments of the present invention. That is, the membrane electrode assembly (hereinafter referred to as a "MEA") of the present invention includes a catalyst layer and a gas diffusion substrate sequentially stacked on either side of the composite electrolyte membrane (that is, a laminate having a layer structure of gas diffusion substrate/catalyst layer/composite electrolyte membrane/catalyst layer/gas diffusion substrate).

Examples of a general method for producing the CCM include a coating method of applying a catalyst layer paste composition for forming a catalyst layer to the surface of the composite electrolyte membrane and drying the composition, and a method of producing only a catalyst layer on a substrate, and transferring the catalyst layer to stack the catalyst layer on the composite electrolyte membrane (transfer method).

When the MEA is produced by pressing, it is possible to employ a known method (for example, the chemical plating method described in The journal of the Electrochemical Society of Japan, 1985, 53, p. 269, edited by J. Electrochem. Soc., and the hot-press bonding method for gas diffusion electrodes described in Electrochemical Science and Technology, 1988, 135, 9, p. 2209). The temperature and pressure during the pressing may be appropriately selected according to the thickness and water content of the composite electrolyte membrane, the catalyst layer, and the electrode substrate. Further, in the present invention, it is possible to form a composite by pressing regardless of whether the electrolyte membrane is in a dry state or in a moistened state. Specific examples of the pressing method include roll pressing in which the pressure and clearance are prescribed, and plate pressing in which the pressure is prescribed. From the viewpoint of industrial productivity and suppression of thermal decomposition of the polymer material having an ionic group, the pressing is preferably performed at a temperature within the range of 0° C. to 250° C. From the viewpoint of protecting the composite electrolyte membrane and the electrodes, it is preferable that the pressure be as low as possible within the range in which the adhesion between the composite electrolyte membrane and the catalyst layer is maintained. In the case of plate pressing, a pressure of 10 MPa or less is preferable. It is also one of the preferable options from the viewpoint of prevention of short circuit between the anode and cathode electrodes that the electrodes and the electrolyte membrane be stacked on each other without forming a composite by the pressing step to form a cell for the electrochemical hydrogen pump or the water electrolysis apparatus. In this method, during the repeated operation of the electrochemical hydrogen pump or the water electrolysis apparatus, the deterioration of the electrolyte membrane, which is presumed to be caused by short circuit, tends to be suppressed, and the electrochemical hydrogen pump or the water electrolysis apparatus is improved in durability. In addition, in controlling the pressing conditions, it is preferable from the viewpoint of obtaining a uniform catalyst coated membrane without wrinkles or delamination to raise the temperature after pressurization, hold the laminate at a predetermined pressure and a predetermined temperature, then lower the temperature while maintaining the pressure, and then release the pressure. If the temperature is raised while the pressure is applied or the pressure is released before the temperature is lowered, three-dimensional thermal shrinkage may occur in a state where the interface between the composite electrolyte membrane and the catalyst layer is not fixed, resulting in delamination due to wrinkles or poor adhesion.

EXAMPLES

Hereinafter, the present invention will be more specifically described with reference to examples, but the present invention is not limited to these examples.

Measurement conditions for various physical properties are as follows.

(1) Molecular Weight of Polymer

The number average molecular weight and the weight average molecular weight of a polymer solution were measured by GPC. Using HLC-8022GPC manufactured by Tosoh Corporation as an ultraviolet detector-differential refractometer integrated device, and using two TSKgel SuperHM-H columns (inner diameter: 6.0 mm, length: 15 cm) manufactured by Tosoh Corporation as GPC columns, the measurement was performed with an N-methyl-2-pyrrolidone solvent (N-methyl-2-pyrrolidone solvent containing 10 mmol/L of lithium bromide) at a flow rate of 0.2 mL/min, and the number average molecular weight and the weight average molecular weight were determined in terms of standard polystyrene.

(2) Ion Exchange Capacity (IEC)

The ion exchange capacity was measured by the neutralization titration method. The measurement was performed three times, and the average of the three measurements was adopted.

1. A composite electrolyte membrane was subjected to proton exchange and thoroughly washed with pure water, and water on the membrane surface was wiped off. Then, the composite electrolyte membrane was vacuum-dried at 100° C. for 12 hours or more, and the dry weight of the membrane was obtained.
2. To the electrolyte, 50 mL of a 5 wt % aqueous sodium sulfate solution was added, and the electrolyte was left standing for 12 hours for ion exchange.
3. The generated sulfuric acid was titrated using a 0.01 mol/L aqueous sodium hydroxide solution. A commercially available 0.1 w/v % phenolphthalein solution for titration was added as an indicator, and the point at which the solution turned pale red-purple was taken as the end point.
4. The IEC was calculated by the following formula.

IEC (meq/g)=[concentration (mmol/mL) of aqueous sodium hydroxide solution×dropping amount (mL) of aqueous sodium hydroxide solution]/ dry weight (g) of sample (3) Film Thickness The film thickness was measured using model ID-C112 manufactured by Mitutoyo Corporation set on Granite Comparator Stand BSG-20 manufactured by Mitutoyo Corporation.

As for the film thickness, an electrolyte membrane or a reinforcing material is cut into a 10-cm square piece, the film thickness is measured at positions of 5 cm from the end in the MD and 1 cm, 3 cm, 5 cm, 7 cm, and 9 cm from the end in the TD, and positions of 5 cm from the end in the TD and 1 cm, 3 cm, 5 cm, 7 cm, and 9 cm from the end in the MD, and the average of the thicknesses at the nine positions is calculated. The average is defined as the film thickness of the electrolyte membrane.

(4) Fiber Diameter, Opening, OPA, and Permeation Volume of Mesh Fabric

A mesh fabric was cut into a 100-mm square piece, and the fiber diameter and the opening were measured using a microscope VHX-2000 manufactured by KEYENCE CORPORATION. The measurement position was set approximately at the midpoint between the intersections of the fibers that constitute the mesh. The fiber diameter and the opening were each measured at ten different positions in the mesh fabric, and the averages of each ten measurements were taken as the fiber diameter (μm) and the opening (μm). The number of meshes was calculated by the following formula.

Number of meshes (pieces/inch)=25400/(opening (μm)+fiber diameter (μm))

The OPA was calculated by the following formula.

OPA (%)={opening (μm)$^2$/(opening+fiber diameter (μm))$^2$}×100

The permeation volume was calculated by the following formula using the gauze thickness (μm) obtained in item (5).

Permeation volume (cc/m$^2$)=(OPA (%)/100)×gauze thickness (μm)

(5) Gauze Thickness of Mesh Fabric

A mesh fabric was cut into a 100-mm square piece, and the gauze thickness was measured using Digimatic Indicator manufactured by Mitutoyo Corporation. The measurement was performed at nine different positions in the mesh fabric, and the average of the nine measurements was taken as the gauze thickness (μm).

(6) Thermal Properties of Polymer and Mesh Fabric

Differential calorimetry was performed using DSC2920 manufactured by TA Instruments Japan Inc. The temperature of the endothermic peak observed in the measurement under a heating condition of 20° C./min from 50° C. was defined as Tm1 (° C.), and the peak half width (° C.) of Tm1 and the heat of fusion ΔHm1 (J/g) at Tm1 were measured. In addition, after Tm1 was observed, the sample was held at a temperature of Tm1+20° C. for 5 minutes, then the sample was cooled to 50° C. once under a cooling condition of 20° C./min, and the temperature of the endothermic peak observed in the measurement under the heating condition of 20° C./min again was defined as Tm2. As for the resin of the reference example, Tm2 was taken as the melting point.

(7) Tensile Strength of Mesh Fabric

A tensile test (n=3) was performed according to JIS L1913(2010) 6.3.1 under the conditions of a sample size of 5 cm×30 cm, a grip distance of 20 cm, and a tensile speed of 10 cm/min. The strength when the sample was broken was defined as the tensile strength (N/5 cm). The average of the samples was calculated, and a value obtained by rounding off the average to one decimal place was taken as the tensile strength (N/5 cm).

(8) Filling Rate of Polymer Electrolyte in Composite Layer

A cross section of a composite electrolyte membrane was observed with an optical microscope or a scanning electron microscope (SEM). The thickness of the composite layer including the polymer electrolyte and the mesh fabric was defined as T1, and when other layers were provided outside the composite layer, thicknesses of the layers were defined as T2 and T3. The specific gravity of the polymer forming the composite layer was defined as D1, the specific gravities of the polymer forming the other layers outside the composite layer were defined as D2 and D3, and the specific gravity of the composite electrolyte membrane was defined as D. With the IECs of the polymers forming the layers being I1, I2, and I3, and the IEC of the composite electrolyte membrane being I, the content Y (volume %) of the polymer electrolyte in the composite layer was calculated by the following formula.

$Y=[(T1+T2+T3)\times D\times I-(T2\times D2\times I2+T3\times D3\times I3)]/(T1\times D1\times I1)\times 100$ (9) Measurement of Dimensional Change Rate ($\lambda_{xy}$) by Hot Water Test A composite electrolyte membrane was cut into a square piece of about 5 cm×about 5 cm, left standing for 24 hours in a temperature- and humidity-controlled atmosphere having a temperature of 23° C.±5° C. and a humidity of 50%±5%, and then the length in the MD and the length in the TD (MD1 and TD1) were measured with a caliper. The electrolyte membrane was immersed in hot water at 80° C. for 8 hours, then the length in the MD and the length in the TD (MD2 and TD2) were measured again with a caliper, and the dimensional change rates of MD and TD in the plane direction ($\lambda_{MD}$ and $\lambda_{TD}$) and the dimensional change rate of the electrolyte membrane in the plane direction ($\lambda_{xy}$) (%) were calculated by the following formulae.

$$\lambda_{MD}=(MD2-MD1)/MD1\times100$$

$$\lambda_{TD}=(TD2-TD1)/TD1\times100$$

$$\lambda_{xy}=(\lambda_{MD}+\lambda_{TD})/2$$

(10) Measurement of Mechanical Strength in Hot Water

The electrolyte membrane as a specimen was left standing in ultrapure water at 80° C. for 24 hours, then set in a device, and tensile measurement was performed under the following conditions. The values of tensile strength and tensile elongation are the values at the moment when the specimen exhibited the maximum point stress during the test. The value of elastic modulus is the value that is the maximum value calculated using two arbitrary points with a strain difference of 1%. The maximum point stress and the elastic modulus were each calculated as the average of five times of the test.

Measurement device: AUTOGRAPH AG-IS (manufactured by SHIMADZU CORPORATION)
Load: 100 N
Tensile speed: 10 ram/min
Test piece: 5 mm in width×50 mm in length
Distance between samples: 20 mm
Test temperature: 80° C., in pure water
Number of tests: n=5

(11) Acid Resistance Test

A specimen immersed in 10 wt % sulfuric acid at 80° C. for 30 days and a composite electrolyte membrane not immersed in the 10 wt % sulfuric acid were subjected to the tensile measurement by the method described in item (10). The degree of acid resistance S was calculated by the following formula in which A is the tensile strength of the specimen not immersed in the 10 wt % sulfuric acid, and B is the tensile strength of the specimen after being immersed in the 10 wt % sulfuric acid.

$$S=(A-B)\times100$$

(12) Production of Catalyst Coated Membrane (CCM)

A platinum catalyst TEC10E50E manufactured by TANAKA KIKINZOKU KOGYO K.K. and "Nafion (registered trademark)" manufactured by E. I. du Pont de Nemours and Company were adjusted to a weight ratio of 2:1 to produce a catalyst ink. The catalyst ink was applied to a commercially available "Teflon (registered trademark)" film so that the amount of platinum might be 0.3 mg/cm$^2$ to produce a catalyst layer transfer film A100. The catalyst layer transfer film was cut into a 5-cm square piece. A pair of the pieces was prepared, and the pieces were stacked to face each other so as to sandwich a polymer electrolyte membrane to be evaluated. Then, the resulting laminate was heated in a pressurized state and hot-pressed at 150° C. and 5 MPa for 3 minutes, cooled to 40° C. or less in the pressurized state, and then the pressure was released to produce a catalyst coated membrane for an electrochemical hydrogen pump.

An iridium oxide catalyst manufactured by Umicore S.A. and "Nafion (registered trademark)" manufactured by E. I. du Pont de Nemours and Company were adjusted to a weight ratio of 2:1 to produce a catalyst ink. The catalyst ink was applied to a commercially available Teflon film so that the amount of iridium might be 2.5 mg/cm$^2$ to produce a catalyst layer transfer film A200. The catalyst layer transfer film and the film A100 were each cut into a 5-cm square piece. A pair of the pieces was prepared, and the pieces were stacked to face each other so as to sandwich a polymer electrolyte membrane to be evaluated. Then, the resulting laminate was heated in a pressurized state and hot-pressed at 150° C. and 5 MPa for 3 minutes, cooled to 40° C. or less in the pressurized state, and then the pressure was released to produce a catalyst coated membrane for a water electrolysis apparatus including the film A200 as the anode and the film A100 as the cathode.

(13) Production of Membrane Electrode Assembly (MEA)

A pair of commercially available gas diffusion electrodes 24BCH manufactured by SGL Carbon were each cut into a 5-cm square piece, and were stacked to face each other so as to sandwich the catalyst coated membrane for an electrochemical hydrogen pump to produce a membrane electrode assembly for an electrochemical hydrogen pump.

Further, the catalyst coated membrane for a water electrolysis apparatus was sandwiched with two commercially available plates of porous titanium sintered body to give a membrane electrode assembly for a water electrolysis apparatus.

(14) Hydrogen Compression Evaluation

The membrane electrode assembly for an electrochemical hydrogen pump was set in a JARI standard cell "Ex-1" (electrode area: 25 cm$^2$) manufactured by EIWA Corporation. At a cell temperature of 40° C., hydrogen humidified to 100% RH was supplied to one electrode (hydrogen supplied electrode: cathode) under the atmospheric pressure at a flow rate of 1 L/min.

The other electrode (hydrogen compressor electrode: anode) had a structure capable of controlling the pressure by a back pressure valve, and was purged with a 100% RH nitrogen gas so that the gas inside the electrode might have the atmospheric pressure before the evaluation.

Before the hydrogen compression evaluation, the nitrogen purge valve of the hydrogen compressor electrode was closed, and power was output at a load current of 10 A using a compact DC power source KX-100L manufactured by TAKASAGO LTD. until the back pressure of the hydrogen compressor electrode reached a gauge pressure of 10 MPa. The membrane electrode assembly was held at 10 MPa for 10 hours. After the evaluation, the membrane electrode assembly was set in a jig for bubble leak test immersed in water, nitrogen was flowed from one side of the membrane electrode assembly, and the presence or absence of nitrogen flowing out to the other side of the membrane electrode assembly was checked to see whether the membrane was broken or not.

(15) Water Electrolysis Evaluation

The membrane electrode assembly for a water electrolysis apparatus was set in a JARI standard cell "Ex-1" (electrode area: 25 cm$^2$) manufactured by EIWA Corporation. At a cell temperature of 80° C., pure water with a conductivity of 1 $\mu$Scm$^{-1}$ or less was supplied to one electrode (oxygen evolution electrode: anode) under the atmospheric pressure at a flow rate of 0.2 L/min.

The other electrode (hydrogen evolution electrode: cathode) had a structure capable of controlling the pressure by a back pressure valve, and was purged with a 100% RH nitrogen gas so that the gas inside the electrode might have the atmospheric pressure before the evaluation.

Power was output at a load current of 50 A (current density: 2 A/cm$^2$) using Multistat 1480 and Power booster Model PBi500L-5U manufactured by Solartron Metrology. The current was maintained at the atmospheric pressure for 10 hours, and then the cell voltage was measured. The lower the cell voltage is, the better the water electrolysis efficiency is.

Synthesis Example 1

Synthesis of Block Copolymer b1

Synthesis of 2,2-bis(4-hydroxyphenyl)-1,3-dioxolane (K-DHBP) represented by the following formula (G1))

[Chemical Formula 3]

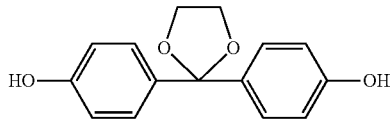

(G1)

In a 500-mL flask equipped with a stirrer, a thermometer, and a distillation tube, 49.5 g of 4,4'-dihydroxybenzophenone, 134 g of ethylene glycol, 96.9 g of trimethyl orthoformate, and 0.50 g of p-toluenesulfonic acid monohydrate were charged and dissolved. Then, the contents were kept warm and stirred at 78 to 82° C. for 2 hours. Further, the internal temperature was gradually raised to 120° C., and the contents were heated until the distillation of methyl formate, methanol, and trimethyl orthoformate completely stopped. After the reaction liquid was cooled to room temperature, the reaction liquid was diluted with ethyl acetate, the organic layer was washed with 100 mL of a 5% aqueous potassium carbonate solution, the resulting liquid was separated, and the solvent was distilled away. To the residue, 80 mL of dichloromethane was added to deposit crystals, and the crystals were filtered and dried to give 52.0 g of 2,2-bis(4-hydroxyphenyl)-1,3-dioxolane.

Synthesis of disodium-3,3'-disulfonate-4,4'-difluorobenzophenone Represented by the Following Formula (G2)

[Chemical Formula 4]

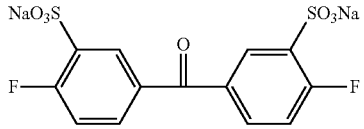

(G2)

In 150 mL of fuming sulfuric acid (50% $SO_3$) (a Wako Pure Chemical reagent), 109.1 g of 4,4'-difluorobenzophenone (an Aldrich reagent) was reacted at 100° C. for 10 hours. Then, the resulting product was gradually poured into a large amount of water, the resulting mixture was neutralized with NaOH, and then 200 g of sodium chloride was added to the mixture to precipitate a synthesized product. The obtained precipitate was filtered off and recrystallized from an aqueous ethanol solution to give the disodium-3,3'-disulfonate-4,4'-difluorobenzophenone represented by the general formula (G2).

Synthesis of Ionic Group-Free Oligomer a1' Represented by the Following Formula (G3)

In a 1000-mL three-necked flask equipped with a stirrer, a nitrogen introduction tube, and a Dean-Stark trap, 16.59 g of potassium carbonate (an Aldrich reagent, 120 mmol), 25.8 g (100 mmol) of K-DHBP, and 20.3 g of 4,4'-difluorobenzophenone (an Aldrich reagent, 93 mmol) were added. After nitrogen substitution, the contents were dehydrated in 300 mL of N-methylpyrrolidone (NMP) and 100 mL of toluene at 160° C., the temperature was raised to remove toluene, and the contents were polymerized at 180° C. for 1 hour. The resulting product was subjected to reprecipitation for purification in a large amount of methanol to produce an ionic group-free oligomer a1 (terminal: hydroxyl group). The oligomer had a number average molecular weight of 10,000.

In a 500-mL three-necked flask equipped with a stirrer, a nitrogen introduction tube, and a Dean-Stark trap, 1.1 g of potassium carbonate (an Aldrich reagent, 8 mmol) and 20.0 g (2 mmol) of the ionic group-free oligomer a1 (terminal: hydroxyl group) were added. After nitrogen substitution, the contents were dehydrated in 100 mL of NMP and 30 mL of cyclohexane at 100° C., and the temperature was raised to remove cyclohexane. Then, 4.0 g of decafluorobiphenyl (an Aldrich reagent, 12 mmol) was added, and the contents were reacted at 105° C. for 1 hour. The resulting product was subjected to reprecipitation for purification in a large amount of isopropyl alcohol to produce an ionic group-free oligomer a1' (terminal: fluoro group) represented by the following formula (G3). The number average molecular weight was 11,000, and the number average molecular weight of the ionic group-free oligomer a1' was determined to be 10,400, which was a value obtained by excluding the linker region (molecular weight: 630).

[Chemical Formula 5]

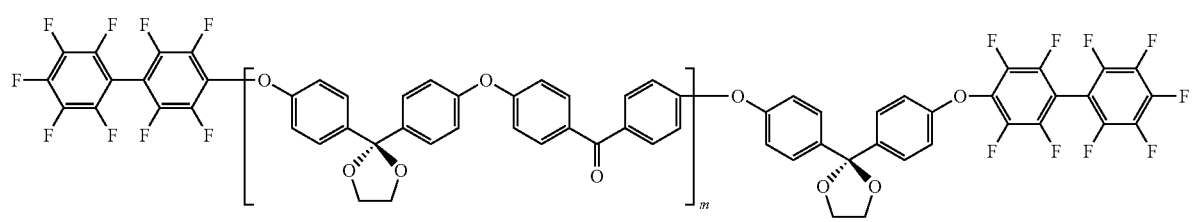

(G3)

Synthesis of Ionic Group-Containing Oligomer a2 Represented by the Following Formula (G4))

In a 1000-mL three-necked flask equipped with a stirrer, a nitrogen introduction tube, and a Dean-Stark trap, 27.6 g of potassium carbonate (an Aldrich reagent, 200 mmol), 12.9 g (50 mmol) of K-DHBP, 9.3 g of 4,4'-biphenol (an Aldrich reagent, 50 mmol), 39.3 g (93 mmol) of disodium-3,3'-disulfonate-4,4'-difluorobenzophenone, and 17.9 g of 18-crown-6 (Wako Pure Chemical Industries, Ltd., 82 mmol) were added. After nitrogen substitution, the contents were dehydrated in 300 mL of NMP and 100 mL of toluene at 170° C., then the temperature was raised to remove toluene, and the contents were polymerized at 180° C. for 1 hour. The resulting product was subjected to reprecipitation for purification in a large amount of isopropyl alcohol to produce an ionic group-containing oligomer a2 (terminal: hydroxyl group) represented by the following formula (G4). The oligomer had a number average molecular weight of 16,000.

Synthesis Example 2

Synthesis of Block Copolymer b2

Synthesis of Polyether Sulfone (PES) Block Copolymer Precursor b2' Including Segment Represented by the Following Formula (G6) and Segment Represented by the Following Formula (G7)

First, 1.78 g of anhydrous nickel chloride and 15 mL of dimethyl sulfoxide were mixed, and the mixture was adjusted to 70° C. To the mixture, 2.37 g of 2, 2'-bipyridyl was added, and the resulting mixture was stirred at the same temperature for 10 minutes to prepare a nickel-containing solution.

In 5 mL of dimethyl sulfoxide, 1.64 g of (2,2-dimethylpropyl)2,5-dichlorobenzenesulfonate and 0.55 g of polyether sulfone (SUMIKA EXCEL PES5200P manufactured by SUMITOMO CHEMICAL COMPANY, LIM-

[Chemical Formula 6]

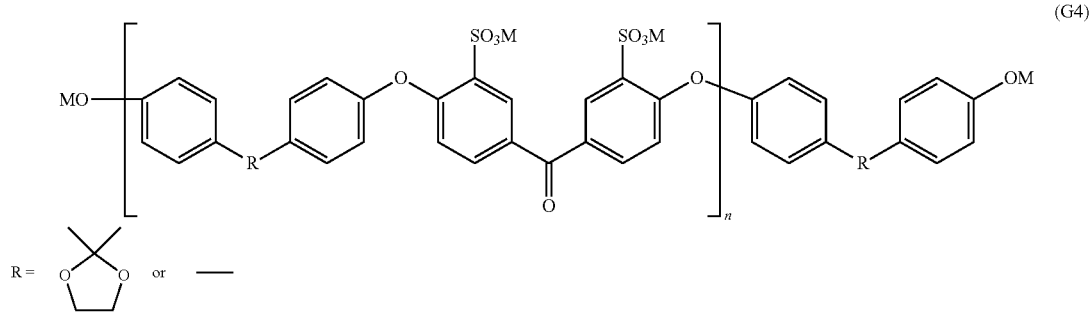

(In the formula (G4), M represents Na or K.)

Synthesis of Block Polymer b1 Containing Oligomer a2 as Ionic Group-Containing Segment (A1), Oligomer a1 as Ionic Group-Free Segment (A2), and Octafluorobiphenylene as Linker Region In a 500-mL three-necked flask equipped with a stirrer, a nitrogen introduction tube, and a Dean-Stark trap, 0.56 g of potassium carbonate (an Aldrich reagent, 4 mmol) and 16 g (1 mmol) of the ionic group-containing oligomer a2 (terminal: hydroxyl group) were added. After nitrogen substitution, the contents were dehydrated in 100 mL of NMP and 30 mL of cyclohexane at 100° C., the temperature was raised to remove cyclohexane, 11 g (1 mmol) of the ionic group-free oligomer a1' (terminal: fluoro group) was added, and the contents were reacted at 105° C. for 24 hours. The resulting product was subjected to reprecipitation for purification in a large amount of isopropyl alcohol to produce a block copolymer b1. The block copolymer had a weight average molecular weight of 340,000.

The block copolymer b1 itself as a polymer electrolyte membrane was immersed in a 10 wt % aqueous sulfuric acid solution at 80° C. for 24 hours for proton exchange and a deprotection reaction, and was immersed in a large excess amount of pure water for 24 hours and thoroughly washed. The block copolymer b1 had an ion exchange capacity determined from the neutralization titration of 2.12 meq/g.

ITED, Mn=40,000, Mw=94,000) represented by the following formula (G5) were dissolved, 1.35 g of a zinc powder was added to the resulting solution, and the resulting mixture was adjusted to 70° C. The nickel-containing solution was poured into the solution, and a polymerization reaction was performed at 70° C. for 4 hours. The reaction mixture was added to 60 mL of methanol, then 60 mL of 6 mol/L hydrochloric acid was added to the mixture, and the mixture was stirred for 1 hour. The deposited solid was separated by filtration and dried to give 1.75 g of an off-white block copolymer precursor b2' (polyarylene precursor) including the segments represented by the following formulae (G6) and (G7) in a yield of 97%. The block copolymer precursor had a weight average molecular weight of 210,000.

[Chemical Formula 7]

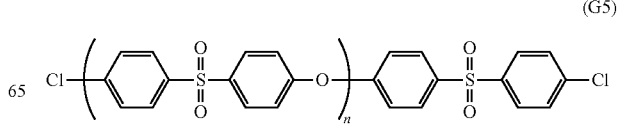

-continued (G6)

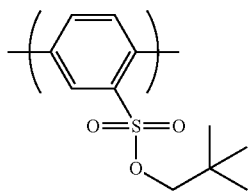

(G7)

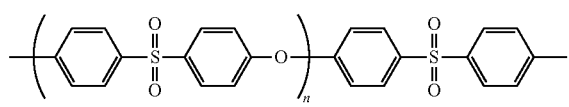

Synthesis of Polyether Sulfone (PES) Block Copolymer b2 Including Segment Represented by the Formula (G7) and Segment Represented by the Following Formula (G8)

To a mixed solution of 0.18 g of lithium bromide monohydrate and 8 mL of N-methyl-2-pyrrolidone, 0.25 g of the block copolymer precursor b2' was added, and the mixture was reacted at 120° C. for 24 hours. The reaction mixture was poured into 80 mL of 6 mol/L hydrochloric acid and stirred for 1 hour. The deposited solid was separated by filtration. The separated solid was dried to give an off-white block copolymer b2 including the segment represented by the formula (G7) and a segment represented by the following formula (G8). The obtained polyarylene had a weight average molecular weight of 190,000.

The block copolymer b2 itself as a polymer electrolyte membrane was immersed in a 10 wt % aqueous sulfuric acid solution at 80° C. for 24 hours for proton exchange, and was immersed in a large excess amount of pure water for 24 hours and thoroughly washed. The block copolymer b2 had an ion exchange capacity determined from the neutralization titration of 2.02 meq/g.

[Chemical Formula 8]

(G8)

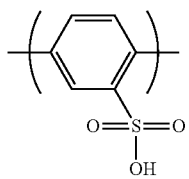

Synthesis Example 3

Synthesis of Block Copolymer b3

Synthesis of Hydrophobic Oligomer a3 Represented by the Following Formula (G9)

[Chemical Formula 9]

(G9)

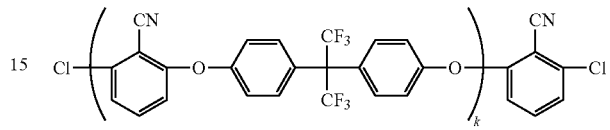

In a 1-L three-necked flask equipped with a stirrer, a thermometer, a cooling tube, a Dean-Stark tube, and a three-way cock for introducing nitrogen, 51.9 g (0.30 mol) of 2,6-dichlorobenzonitrile, 92.8 g (0.27 mol) of 2,2-bis(4-hydroxyphenyl)-1,1,1,3,3,3-hexafluoropropane, and 49.7 g (0.36 mol) of potassium carbonate were weighed.

After nitrogen substitution, 363 mL of sulfolane and 181 mL of toluene were added to the contents, and the resulting mixture was stirred. The flask was placed in an oil bath and heated to 150° C. for reflux. The water generated by the reaction was azeotropically distilled with toluene, and the reaction was continued with the water being removed to the out of the system with the Dean-Stark tube. As a result, generation of water almost ceased to be observed in about 3 hours. Most of toluene was removed with the reaction temperature being gradually raised, and then the reaction was continued at 200° C. for 3 hours. Then, 12.9 g (0.076 mol) of 2,6-dichlorobenzonitrile was added, and the reaction was performed for another 5 hours.

The obtained reaction liquid was allowed to cool, and then 100 mL of toluene was added for dilution. The by-produced inorganic compound precipitate was removed by filtration, and the filtrate was poured into 2 L of methanol. The precipitated product was filtered off, collected, dried, and then dissolved in 250 mL of tetrahydrofuran. The resulting solution was reprecipitated in 2 L of methanol to give 109 g of a target oligomer. The oligomer had a number average molecular weight of 8,000.

Synthesis of Hydrophilic Monomer Represented by the Following Formula (G10))

[Chemical Formula 10]

(G10)

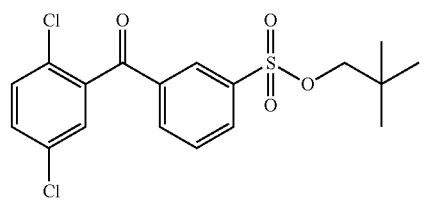

To a 3-L three-necked flask equipped with a stirrer and a cooling tube, 245 g (2.1 mol) of chlorosulfonic acid was added, subsequently 105 g (420 mmol) of 2,5-dichlorobenzophenone was added, and the contents were reacted in an oil bath at 100° C. for 8 hours. After a predetermined time, the reaction liquid was slowly poured into 1,000 g of crushed ice and extracted with ethyl acetate. The organic layer was washed with brine and dried over magnesium sulfate, and then ethyl acetate was distilled away to give light yellow crude crystals of 3-(2,5-dichlorobenzoyl)benzenesulfonic acid chloride. The crude crystals were used in the next step as they were without purification.

To 300 mL of pyridine, 41.1 g (462 mmol) of 2,2-dimethyl-1-propanol (neopentyl alcohol) was added, and the resulting mixture was cooled to about 10° C. The crude crystals obtained as described above were gradually added to the mixture over about 30 minutes. After all the crude crystals were added, the mixture was stirred for another 30 minutes to react. After the reaction, the reaction liquid was poured into 1,000 mL of aqueous hydrochloric acid, and the deposited solid was collected. The obtained solid was dissolved in ethyl acetate, the resulting solution was washed with an aqueous sodium hydrogen carbonate solution and brine and dried over magnesium sulfate, and ethyl acetate was distilled away to give crude crystals. The crude crystals were recrystallized from methanol to give white crystals of neopentyl 3-(2,5-dichlorobenzoyl)benzenesulfonate represented by the structural formula.

Synthesis of Polyarylene Block Copolymer b3 Represented by the Following Formula (G11))

[Chemical Formula 11]

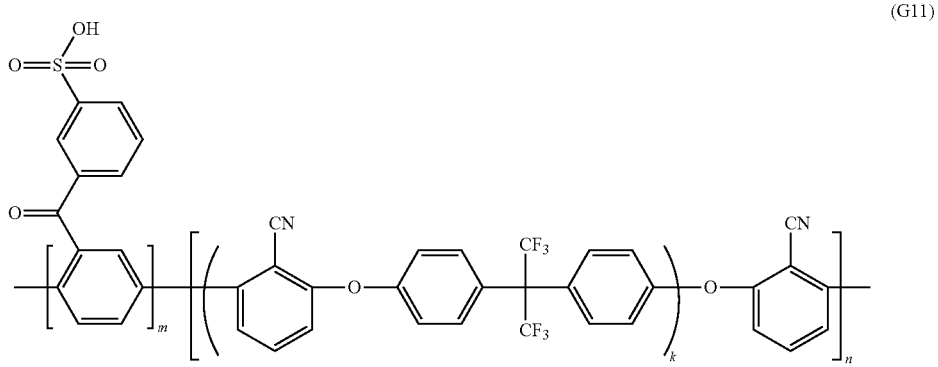

(G11)

In a 1-L three-necked flask equipped with a stirrer, a thermometer, and a nitrogen introduction tube, 166 mL of dried N,N-dimethylacetamide (DMAc) was added to a mixture of 15.1 g (1.89 mmol) of the hydrophobic oligomer a3, 39.5 g (98.4 mmol) of neopentyl 3-(2,5-dichlorobenzoyl) benzenesulfonate, 2.75 g (4.2 mmol) of bis(triphenylphosphine)nickel dichloride, 11.0 g (42.1 mmol) of triphenylphosphine, 0.47 g (3.15 mmol) of sodium iodide, and 16.5 g (253 mmol) of zinc under nitrogen.

The reaction system was heated (finally warmed to 82° C.) with stirring and reacted for 3 hours. An increase in the viscosity of the system was observed during the reaction. The polymerization reaction solution was diluted with 180 mL of DMAc, stirred for 30 minutes, and filtered using Celite as a filter aid. In a 1-L three-necked flask equipped with a stirrer, 25.6 g (295 mmol) of lithium bromide divided into three equal portions was added to the filtrate in three additions at an interval of 1 hour, and the mixture was reacted at 120° C. for 5 hours in a nitrogen atmosphere. After the reaction, the mixture was cooled to room temperature, poured into 4 L of acetone, and solidified. The solidified product was collected by filtration, air-dried, pulverized with a mixer, and washed with 1,500 mL of 1 N sulfuric acid with stirring. After filtration, the product was washed with ion-exchanged water until the washing liquid came to have a pH of 5 or more, and then dried at 80° C. overnight to give a target block copolymer b3. The block copolymer had a weight average molecular weight of 200,000.

The block copolymer b3 itself as a polymer electrolyte membrane was immersed in a 10 wt % aqueous sulfuric acid solution at 80° C. for 24 hours for proton exchange, and was immersed in a large excess amount of pure water for 24 hours and thoroughly washed. The block copolymer b3 had an ion exchange capacity determined from the neutralization titration of 2.38 meq/g.

Synthesis Example 4

Synthesis of Random Copolymer r1

Synthesis of Polyketal Ketone Random Copolymer r1 Containing Monomer Represented by the Formula (G1), 4,4'-Difluorobenzophenone, and Monomer Represented by the Formula (G2)

In a 500-mL three-necked flask equipped with a stirrer, a nitrogen introduction tube, and a Dean-Stark trap, 13.82 g of potassium carbonate (an Aldrich reagent, 100 mmol), 20.66 g (80 mmol) of K-DHBP obtained as an intermediate product of Synthesis Example 1, 10.5 g of 4,4'-difluorobenzophenone (an Aldrich reagent, 48 mmol), and 13.5 g (32 mmol) of disodium-3,3'-disulfonate-4,4'-difluorobenzophenone obtained as an intermediate product of Synthesis Example 1 were added. After nitrogen substitution, the contents were dehydrated in 100 mL of N-methylpyrrolidone (NMP) and 50 mL of toluene at 180° C., the temperature was raised to remove toluene, and the contents were polymerized at 230° C. for 6 hours. The resulting product was subjected to reprecipitation for purification in a large amount of water to produce a polyketal ketone random copolymer. The random copolymer had a weight average molecular weight of 250,000.

The random copolymer r1 itself as a polymer electrolyte membrane was immersed in a 10 wt % aqueous sulfuric acid solution at 80° C. for 24 hours for proton exchange and a deprotection reaction, and was immersed in a large excess amount of pure water for 24 hours and thoroughly washed. The random copolymer r1 had an ion exchange capacity determined from the neutralization titration of 1.51 meq/g.

Production Example 1

Production of Mesh Fabric Including Liquid Crystal Polyester Fiber

In a 5-L reaction vessel equipped with a stirring blade and a distillation tube, 870 parts by weight of p-hydroxybenzoic acid, 327 parts by weight of 4,4'-dihydroxybiphenyl, 89 parts by weight of hydroquinone, 292 parts by weight of terephthalic acid, 157 parts by weight of isophthalic acid, and 1460 parts by weight of acetic anhydride (1.10 equivalents of total phenolic hydroxyl groups) were charged, and the contents were heated from room temperature to 145° C. over 30 minutes with stirring in a nitrogen gas atmosphere and then reacted at 145° C. for 2 hours. Then, the resulting product was heated to 335° C. over 4 hours.

The polymerization temperature was maintained at 335° C., the pressure was reduced to 133 Pa over 1.5 hours, the reaction was continued for another 40 minutes, and polycondensation was completed when the torque reached 28 kgcm. Then, the inside of the reaction vessel was pressurized to 0.1 MPa, the polymer was discharged into a strand through a spinneret having one circular discharge port having a diameter of 10 mm, and the strand was pelletized with a cutter.

The obtained liquid crystal polyester had the composition and melting point as shown in Table 1.

TABLE 1

| | | | Production Example 1 |
|---|---|---|---|
| p-Hydroxybenzoic acid unit | | mol % | 54 |
| 4,4'-Dihydroxybiphenyl unit | | mol % | 16 |
| Hydroquinone unit | | mol % | 7 |
| Terephthalic acid unit | | mol % | 15 |
| Isophthalic acid unit | | mol % | 8 |
| Characteristics of liquid crystal polyester | Melting point | ° C. | 320 |

The liquid crystal polyester was vacuum-dried at 160° C. for 12 hours and then melt-extruded with a φ15 mm single-screw extruder manufactured by OSAKA SEIKI KOSAKU K.K., and the polymer was supplied to a spinning pack while being measured with a gear pump. In the spinning pack, the polymer was filtered using a metal nonwoven fabric filter, and the polymer was discharged under the conditions shown in Table 2. The introduction hole located immediately above the spinneret hole was a straight hole, and the connecting portion between the introduction hole and the spinneret hole was tapered. The discharged polymer was passed through a 40-mm heat retaining region and then cooled and solidified at 25° C. from the outside of the yarn by an annular cooling air stream, then a spinning oil containing a fatty acid ester compound as a main component was applied to the yarn, and all the filaments were taken up on a first godet roll at the spinning speed shown in Table 2. The filaments were passed on a second godet roll having the same speed as that of the first godet roll, then all of the filaments except one were sucked with a suction gun, and the remaining fiber with a number of filaments of 1 was passed through a dancer arm and wound into a pirn shape using a pirn winder (EFT type take up winder manufactured by KOZU SEISAKUSHO CO., LTD., no contact roll that comes into contact with the wound package).

TABLE 2

| | | | Production Example 1 | Production Example 2 |
|---|---|---|---|---|
| Melt spinning conditions | Spinning temperature | ° C. | 345 | 345 |
| | Discharge rate | g/min | 2.4 | 1.9 |
| | Spinneret hole diameter | mm | 0.13 | 0.13 |
| | Land length | mm | 0.26 | 0.26 |
| | L/D | — | 2.0 | 2.0 |
| | Number of holes | [number] | 4 | 4 |
| | Spinning speed | m/min | 1000 | 1200 |

The spun fiber package was rewound using an SSP-MV type rewinder (contact length: 200 mm, number of turns: 8.7, taper angle: 45°) manufactured by KOZU SEISAKUSHO CO., LTD. The spun fiber was unwound in the longitudinal direction (direction perpendicular to the fiber winding direction) without using a speed control roller, and a solid phase polymerization oil was fed using an oiling roller (satin-finished stainless steel roll). For the solid phase polymerization oil, 1.0 wt % of Talc SG-2000 (manufactured by NIPPON TALC CO., LTD.) was dispersed in an aqueous solution containing 6.0 wt % of a phosphoric acid compound represented by the following chemical formula (1).

[Chemical Formula 12]

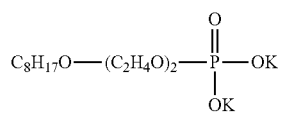

(1)

A stainless steel perforated bobbin covered with Kevlar felt (basis weight: 280 g/m², thickness: 1.5 mm) was used as the core material for rewinding, and the surface pressure was set to 100 gf. The oil adhesion rate of the solid phase polymerization oil to the fiber after rewinding, and the rewinding conditions are shown in Table 3.

Then, the stainless steel perforated bobbin was removed from the rewound package, and the package including the Kevlar felt and the fiber wound thereon was subjected to solid phase polymerization. For the solid phase polymerization, a closed oven was used. The package was heated from room temperature to 240° C. over about 30 minutes, held at 240° C. for 3 hours, then heated to the maximum temperature shown in Table 3 at 4° C./hour, and held for the holding time shown in Table 3 for solid phase polymerization. As for the atmosphere, dehumidified nitrogen was supplied at a flow rate of 20 NL/min, and the oven was evacuated from the exhaust port so that the interior of the oven might not be pressurized excessively.

TABLE 3

| | | | Production Example 1 | Production Example 3 |
|---|---|---|---|---|
| Rewinding | Rewinding speed | m/min | 400 | 400 |
| | Winding tension | cN/dtex | 0.16 | 0.30 |
| | Winding density | g/cc | 0.5 | 0.6 |
| | Winding amount | m | 500,000 | 100,000 |

TABLE 3-continued

| | | | Production Example 1 | Production Example 3 |
|---|---|---|---|---|
| Solid phase polymerization | Maximum temperature | °C. | 290 | 290 |
| | Holding time at maximum temperature | hr | 20 | 20 |

Then, the fiber was unwound from the package after being subjected to the solid phase polymerization, and continuously subjected to high-temperature non-contact heat treatment. The package after being subjected to the solid phase polymerization was put on a free-roll creel (having a shaft, a bearing, and an outer layer that is freely rotatable, but not having a brake and a drive source). The yarn was drawn from the creel in the lateral direction (fiber winding direction), and the fiber was continuously passed through a bath (having no guide inside to contact the fiber) having slits at both ends and having a bath length of 150 cm (contact length: 150 cm) to wash off the oil. The washing liquid was warm water at 50° C. containing 0.2 wt % of a non-ionic/anionic surfactant (Gran Up US-30 manufactured by Sanyo Chemical Industries, Ltd.). The washing liquid was temperature-controlled in an external tank and supplied to the water tank using a pump. For supplying the washing liquid to the water tank, a pipe having holes at an interval of 5 cm was inserted into the water tank, and the washing liquid was supplied to the pipe to form a liquid flow in the water tank. The water tank has a mechanism for collecting the washing liquid overflowed from the slits and the holes for liquid level adjustment and returning the washing liquid to the external tank.

The washed fiber was subsequently passed through a bath (having no guide inside to contact the fiber) having slits at both ends and having a bath length of 23 cm (contact length: 23 cm), and rinsed with warm water at 50° C. The rinsed fiber was passed through a bearing roller guide, and water was blown off and removed from the fiber using an air stream. Then, the fiber was passed through a first roller equipped with a separate roller. Since the free-roll creel was used, tension was applied to the fiber by the first roller to unwind the fiber from the solid-phase-polymerized package and allow the fiber to run.

The fiber having passed through the roller was allowed to run between heated slit heaters to be subjected to high-temperature non-contact heat treatment under the conditions shown in Table 4. No guides were provided inside the slit heaters, and the heaters and the fiber did not come into contact with each other. After passing through the heaters, the fiber was passed through a second roller equipped with a separate roller. The yarn speed before the heat treatment represents the surface speed of the first roller, and the yarn speed after the heat treatment represents the surface speed of the second roller. To the fiber having passed through the second roller, a finishing oil containing a fatty acid ester compound as a main component was applied by a ceramic oiling roller, and the fiber was wound into a pirn shape using an EFT type bobbin traverse winder (manufactured

TABLE 4

| | | | Production Example 1 | Production Example 3 |
|---|---|---|---|---|
| High-temperature heat treatment | Heater temperature | °C. | 480 | 460 |
| | Heater length | mm | 1000 | 1000 |
| | Yarn speed before heat treatment | m/min | 198 | 198 |
| | Yarn speed after heat treatment | m/min | 200 | 200 |
| | Stretch rate | % | 1.0 | 1.0 |
| | Treatment time | second | 0.30 | 0.30 |
| | Running tension | gf | 0.5 | 0.4 |
| | Running stress | cN/dtex | 0.08 | 0.03 |

The obtained liquid crystal polyester fiber was warped for forming a warp, and a fabric was woven from the fiber using a rapier loom so that the fabric might have a number of meshes of 330 pieces/inch to give a mesh fabric A. The characteristics of the mesh fabric are shown in Table 5.

TABLE 5

| | | | Production Example 1 | Production Example 2 | Production Example 3 |
|---|---|---|---|---|---|
| Mesh fabric | Tm1 | °C. | 323 | 323 | 322 |
| | ΔHm1 | J/g | 0.8 | 0.8 | 0.7 |
| | Peak half width at Tm1 | °C. | 25 | 25 | 26 |
| | Tensile strength of mesh | N/5 cm | 463 | 208 | 348 |

Production Examples 2 and 3

Production of Mesh Fabric Including Liquid Crystal Polyester Fiber

A fabric was woven in the same manner as in Production Example 1 except that the fabric was woven using the liquid crystal polyester fiber obtained in Production Example 1 so that the fabric might have a number of meshes of 150 pieces/inch to give a mesh fabric D of Production Example 2. The characteristics of the mesh fabric are shown in Table 5.

Further, yarn making was performed in the same manner as in Production Example 1 except that the yarn making was performed using the liquid crystal polyester obtained in Production Example 1 under the spinning conditions shown in Table 2, the rewinding conditions shown in Table 3, and the high-temperature heat treatment conditions shown in Table 4 to give a liquid crystal polyester fiber. A fabric was woven in the same manner as in Production Example 1 except that the fabric was woven using the obtained fiber so that the fabric might have a number of meshes of 380 pieces/inch to give a mesh fabric E of Production Example 3. The characteristics of the mesh fabric are shown in Table 5.

Production Example 4

Production of Mesh Fabric Containing Polyphenylene Sulfide

Using a polyphenylene sulfide polymer having a melting point (Tm1) of 278° C. and using a melt spinning machine having a single-screw extruder, the polyphenylene sulfide polymer was melt-extruded at a spinning temperature of 330° C. and a single hole discharge rate of 2.6 g/min, and an undrawn yarn (monofilament) was taken up at a take-up speed of 850 m/min. The undrawn yarn was drawn at a draw ratio of 3.4 and a drawing temperature of 98° C. using a hot roller drawing machine, and heat-set at 150° C. to give a polyphenylene sulfide fiber having a fineness of 8.8 dtex. A fabric was woven in the same manner as in Production Example 1 except that the fabric was woven using the obtained fiber so that the fabric might have a number of meshes of 150 pieces/inch to give a mesh fabric F. The mesh fabric had a tensile strength of 79 N/5 cm.

Example 1

In 80 g of NMP, 20 g of the block copolymer b1 obtained in Synthesis Example 1 was dissolved, and the resulting solution was stirred with a stirrer at 20,000 rpm for 1 hour to adjust a transparent polymer electrolyte solution b1 having a polymer concentration of 20 mass %.

The obtained polymer electrolyte solution b1 was pressure-filtered using a glass fiber filter, then the polymer electrolyte solution b1 was applied to a PET substrate by cast coating using an applicator, and the mesh fabric A including the liquid crystal polyester fiber was bonded to the PET substrate. The resulting laminate was held at room temperature for 10 minutes to sufficiently impregnate the mesh fabric A with the polymer electrolyte solution b1, and then the laminate was dried at 100° C. for 4 hours. The polymer electrolyte solution b1 was applied again to the upper surface of the dried membrane by cast coating, and the laminate was held at room temperature for 1 hour and then dried at 100° C. for 4 hours to produce a film-like polymer. After being immersed in a 10 wt % aqueous sulfuric acid solution at 80° C. for 24 hours for proton exchange and a deprotection reaction, the polymer was immersed in a large excess amount of pure water for 24 hours and thoroughly washed to give a composite electrolyte membrane (film thickness: 50 µm).

Example 2

A composite electrolyte membrane (film thickness: 50 µm) was obtained in the same manner as in Example 1 except that a 20% "Nafion (registered trademark)" solution (D2021) manufactured by E. I. du Pont de Nemours and Company was used instead of the polymer electrolyte solution b1.

Example 3

A composite electrolyte membrane (film thickness: 50 µm) was obtained in the same manner as in Example 1 except that the block copolymer b2 obtained in Synthesis Example 2 was used instead of the block copolymer b1.

Example 4

A composite electrolyte membrane (film thickness: 50 µm) was obtained in the same manner as in Example 1 except that the block copolymer b3 obtained in Synthesis Example 3 was used instead of the block copolymer b1.

Example 5

A composite electrolyte membrane (film thickness: 50 µm) was obtained in the same manner as in Example 1 except that the random copolymer r1 obtained in Synthesis Example 4 was used instead of the block copolymer b1.

Example 6

A composite electrolyte membrane (film thickness: 50 µm) was obtained in the same manner as in Example 1 except that "V-SCREEN V330" (mesh fabric B) manufactured by NBC Meshtec Inc., a core-sheath composite fiber made from a liquid crystal polyester and other components, was used instead of the mesh fabric A.

Comparative Example 1

A polymer electrolyte membrane (film thickness: 50 µm) was obtained in the same manner as in Example 1 except that the mesh fabric A was not bonded to the PET substrate, and that the second application of the polymer electrolyte solution A by cast coating and drying were not performed.

Comparative Example 2

A composite electrolyte membrane (film thickness: 100 µm) was obtained in the same manner as in Example 1 except that a mesh fabric including a polyether ether ketone fiber (mesh fabric C) was used instead of the mesh fabric A.

Examples 7 and 8

A composite electrolyte membrane (film thickness: 50 µm) was obtained in the same manner as in Example 1 except that the mesh fabric D was used in Example 7, and the mesh fabric E was used in Example 8 instead of the mesh fabric A.

Example 9

A composite electrolyte membrane (film thickness 60 µm) was obtained in the same manner as in Example 1 except that the mesh fabric F was used instead of the mesh fabric A.

Example 10

A composite electrolyte membrane was obtained in the same manner as in Example 1 except that the film thickness was 80 µm.

The structures and physical properties of the polymer electrolyte membranes used in the examples and comparative examples, and the results of hydrogen compression evaluation and water electrolysis evaluation of the membranes are shown in Tables 6 and 7.

TABLE 6

| | Polymer electrolyte | Type | Fiber diameter (μm) | Gauze thickness (μm) | Opening (μm) | Opening area (%) | Permeation volume (cc/m²) | Gauze thickness/ fiber diameter | Opening/ fiber diameter |
|---|---|---|---|---|---|---|---|---|---|
| Example 1 | b1 | A | 25 | 35 | 52 | 45 | 15.8 | 1.40 | 2.08 |
| Example 2 | Nafion | A | 25 | 35 | 52 | 45 | 15.8 | 1.40 | 2.08 |
| Example 3 | b2 | A | 25 | 35 | 52 | 45 | 15.8 | 1.40 | 2.08 |
| Example 4 | b3 | A | 25 | 35 | 52 | 45 | 15.8 | 1.40 | 2.08 |
| Example 5 | r1 | A | 25 | 35 | 52 | 45 | 15.8 | 1.40 | 2.08 |
| Example 6 | b1 | B | 23 | 43 | 54 | 49 | 26.5 | 1.87 | 2.35 |
| Comparative Example 1 | b1 | — | — | — | — | — | — | — | — |
| Comparative Example 2 | b1 | C | 38 | 50 | 125 | 58 | 28.8 | 1.32 | 3.29 |
| Example 7 | b1 | D | 24 | 36 | 145 | 74 | 26.5 | 1.50 | 3.08 |
| Example 8 | b1 | E | 22 | 28 | 45 | 45 | 12.6 | 1.27 | 2.05 |
| Example 9 | b1 | F | 27 | 49 | 142 | 71 | 34.6 | 1.81 | 2.63 |
| Example 10 | b1 | A | 25 | 35 | 52 | 45 | 15.8 | 1.40 | 2.08 |

TABLE 7

| | Composite electrolyte membrane | | | | | | Hydrogen compression evaluation Breakage of membrane after hydrogen compression at 10 MPa | Water electrolysis evaluation Cell voltage (V) |
|---|---|---|---|---|---|---|---|---|
| | Film thickness (μm) | Filling rate (%) | $\lambda_{xy}$(%) | Tensile strength (MPa) | Elastic modulus (MPa) | Degree of acid resistance (%) | | |
| Example 1 | 50 | 61 | 1 | 197 | 1610 | 99 | None | 1.69 |
| Example 2 | 50 | 50 | 1 | 180 | 1350 | 99 | None | 1.71 |
| Example 3 | 50 | 62 | 1 | 197 | 1550 | 98 | None | 1.72 |
| Example 4 | 50 | 61 | 1 | 197 | 1520 | 99 | None | 1.73 |
| Example 5 | 50 | 60 | 1 | 197 | 1720 | 99 | None | 1.76 |
| Example 6 | 50 | 70 | 1 | 191 | 1810 | 80 | None | 1.69 |
| Comparative Example 1 | 50 | — | 13 | 31 | 35 | 98 | Observed | 1.67 |
| Comparative Example 2 | 100 | 68 | 1 | 32 | 120 | 97 | None | 1.73 |
| Example 7 | 50 | 83 | 1 | 122 | 1350 | 99 | None | 1.68 |
| Example 8 | 50 | 56 | 1 | 160 | 1450 | 99 | None | 1.69 |
| Example 9 | 60 | 80 | 2 | 80 | 550 | 98 | None | 1.71 |
| Example 10 | 80 | 61 | 2 | 120 | 1000 | 99 | None | 1.71 |

The invention claimed is:

1. A composite electrolyte membrane comprising a composite layer that is a composite of a mesh fabric including a liquid crystal polyester fiber or a polyphenylene sulfide fiber, wherein a fiber that constitutes the mesh fabric has a fiber diameter of 10 μm or more and 50 μm or less, and satisfying conditions (1) and (2) shown below, and a polymer electrolyte, and a layer containing only a polymer electrolyte material in contact with either side or one side of the composite layer:

gauze thickness (μm)/fiber diameter (μm)<2.0; and (1)

opening (μm)/fiber diameter (μm)>1.0, (2)

wherein:
the mesh fabric is a woven fabric made of warp and weft,
the thickness of the composite layer is 10 μm or more and 50 μm or less, and
the mesh fabric has a gauze thickness of 50 μm or less.

2. The composite electrolyte membrane according to claim 1, wherein the mesh fabric includes a liquid crystal polyester fiber, and the liquid crystal polyester fiber contains a single component of liquid crystal polyester.

3. The composite electrolyte membrane according to claim 1, wherein the liquid crystal polyester fiber contains a wholly aromatic polyester.

4. The composite electrolyte membrane according to claim 3, wherein the wholly aromatic polyester is a liquid crystal polyester including structural units (I), (II), (III), (IV), and (V) shown below:

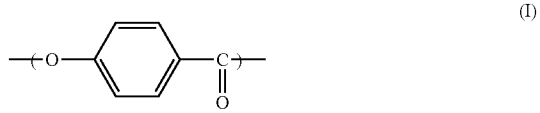

(I)

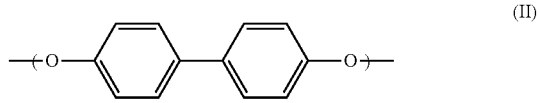

(II)

-continued

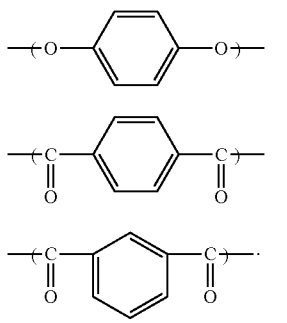

(III)

(IV)

(V)

5. The composite electrolyte membrane according to claim 1, wherein the fiber that constitutes the mesh fabric has a fiber diameter of 10 μm or more and 40 μm or less.

6. The composite electrolyte membrane according to claim 1, wherein the mesh fabric has an opening of 30 μm or more.

7. The composite electrolyte membrane according to claim 1, wherein the mesh fabric has an opening area of 30% or more.

8. The composite electrolyte membrane according to claim 1, wherein the mesh fabric has a permeation volume of 10 cc/m² or more.

9. The composite electrolyte membrane according to claim 1, wherein the mesh fabric has a heat of fusion $\Delta Hm1$ of 6.0 J/g or less.

10. The composite electrolyte membrane according to claim 1, wherein the polymer electrolyte is a hydrocarbon polymer electrolyte.

11. A catalyst coated membrane comprising the composite electrolyte membrane according to claim 1, and a catalyst layer on either side of the composite electrolyte membrane.

12. A membrane electrode assembly comprising the composite electrolyte membrane according to claim 1.

13. An electrochemical hydrogen pump comprising the composite electrolyte membrane according to claim 1.

14. A water electrolysis apparatus comprising the composite electrolyte membrane according to claim 1.

15. The composite electrolyte membrane according to claim 1 including the only one composite layer.

16. The composite electrolyte membrane according to claim 1, wherein the composite electrolyte membrane has a film thickness of 50 μm or more and 80 μm or less.

17. The composite electrolyte membrane according to claim 1, wherein the gauze thickness (μm)/fiber diameter (μm)≤1.7.

18. The composite electrolyte membrane according to claim 1, wherein the polymer electrolyte of the composite layer and the polymer electrolyte material of the layer containing only a polymer electrolyte material are proton-exchanged.

* * * * *